United States Patent [19]

Nishiya et al.

[11] Patent Number: 5,127,063
[45] Date of Patent: Jun. 30, 1992

[54] PROCESSOR FOR PATTERN DATA, MEASURED PROCESS INFORMATION, AND IMAGE INFORMATION

[75] Inventors: Takushi Nishiya, Machida; Motohisa Funabashi, Sagamihara, both of Japan

[73] Assignee: Hitachi, Ltd., Tokyo, Japan

[21] Appl. No.: 410,053

[22] Filed: Sep. 20, 1989

[30] Foreign Application Priority Data

Sep. 22, 1988 [JP] Japan .................. 63-236402

[51] Int. Cl.⁵ .............. G06K 9/00; G06K 15/336; G06K 19/20; G06F 15/00
[52] U.S. Cl. ...................... 382/8; 382/16; 382/42; 382/48; 382/56; 364/413.17; 364/221.9; 364/275.2; 364/975.4; 318/596
[58] Field of Search ............ 382/16, 54, 56, 9, 42, 382/43, 48, 8; 364/221.4, 221.8, 221.9, 221.3, 264.5, 274.2, 274.5, 275.2, 920.7, 972.3, 975.4, 413.17, 724.02; 318/568.19, 596, 609, 610

[56] References Cited

U.S. PATENT DOCUMENTS

| | | | |
|---|---|---|---|
| 4,326,252 | 4/1982 | Kohno et al. | 364/414 |
| 4,630,309 | 12/1986 | Karow | 382/56 |
| 4,648,120 | 3/1987 | Chittineni | 382/54 |
| 4,771,474 | 9/1988 | Takashima et al. | 382/56 |
| 4,884,225 | 11/1989 | Fogarty et al. | 364/559 |
| 4,918,611 | 4/1990 | Shyu et al. | 382/8 |

Primary Examiner—Michael Razavi
Assistant Examiner—Michael R. Cammarata
Attorney, Agent, or Firm—Antonelli, Terry, Stout & Kraus

[57] ABSTRACT

In order to easily identify a pattern of time-series state changes based on measured information so as to facilitate representation of edge portions of an image, features extracted in a form of expansion coefficients of polynomials from the measured information are translated into abstract expressions so as to detect from the measured information significant control information which has not been used in the conventional technology, and features extracted in a form of expansion coefficients from brightness changes in the vicinity of each pixel constituting image data are translated into abstract expression.

19 Claims, 19 Drawing Sheets

F I G. 1
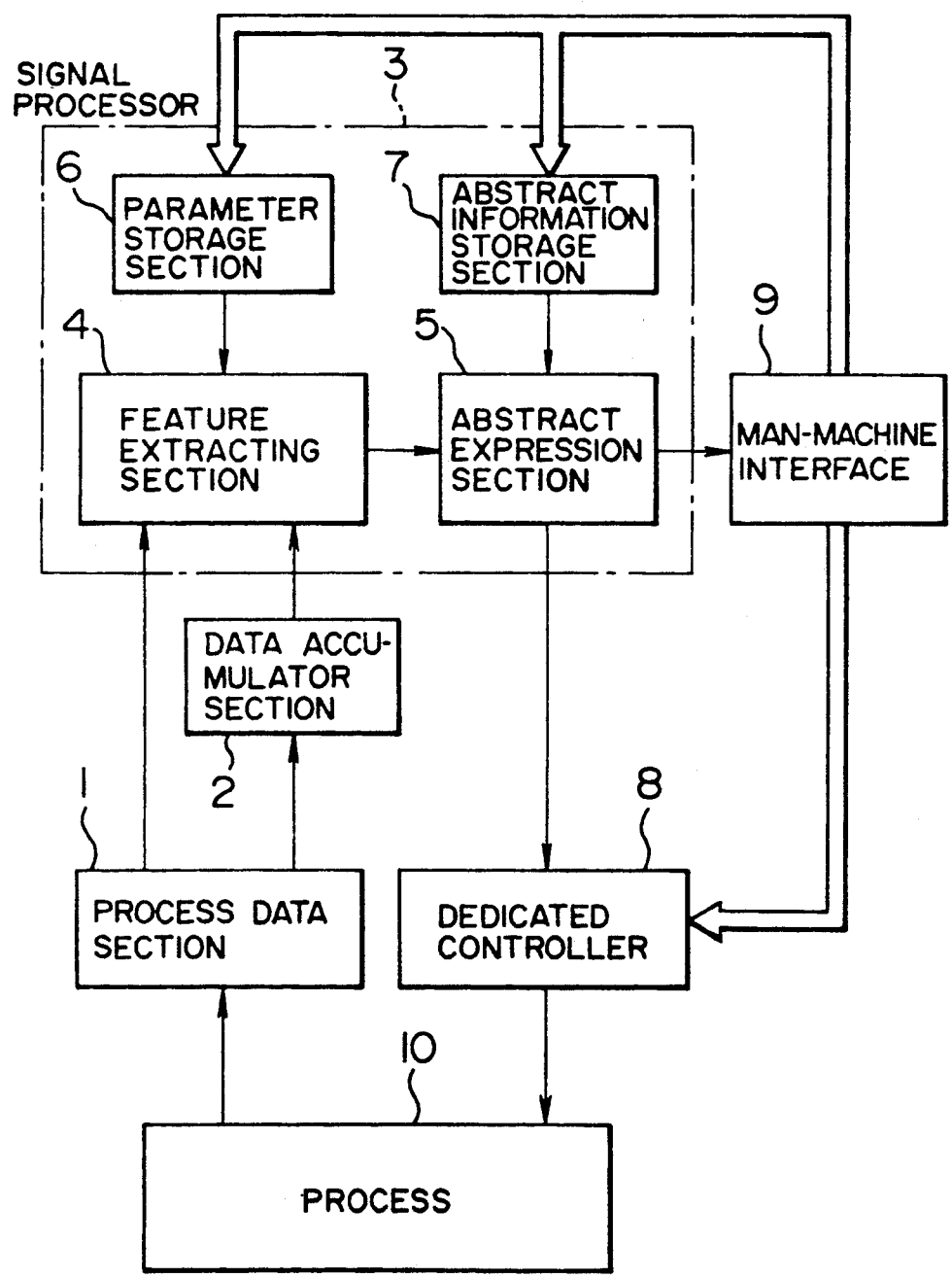

FIG. 4A

| CHARACTERISTIC QUANTITY $S_0$ | ABSTRACT EXPRESSION |
|---|---|
| $a_2 \leq S_0$ | PB |
| $a_1 \leq S_0 < a_2$ | PM |
| $a_0 \leq S_0 < a_1$ | PS |
| $-a_0 \leq S_0 < a_0$ | ZR |
| $-a_1 \leq S_0 < -a_0$ | NS |
| $-a_2 \leq S_0 < -a_1$ | NM |
| $S_0 < -a_2$ | NB |

FIG. 4B

| $S_1$ \ $S_2$ | $S_2 < -c_1$ | $-c_1 \leq S_2 < -c_0$ | $-c_0 \leq S_2 < c_0$ | $c_0 \leq S_2 < c_1$ | $c_1 \leq S_2$ |
|---|---|---|---|---|---|
| $b_1 \leq S_1$ | (++, 0) | (++, +) | (++, ++) | (+, ++) | (0, ++) |
| $b_0 \leq S_1 < b_1$ | (++, −) | (++, 0) | (+, +) | (0, ++) | (−, ++) |
| $-b_0 \leq S_1 < b_0$ | (++, −−) | (+, −) | (0, 0) | (−, +) | (−−, ++) |
| $-b_1 \leq S_1 < -b_0$ | (+, −−) | (0, −−) | (−, −) | (−−, 0) | (−−, +) |
| $S_1 < -b_1$ | (0, −−) | (−, −−) | (−−, −−) | (−−, −) | (−−, 0) |

$$\begin{cases} \{(1),(2),(3)\} = 0 \\ \{(4),(5),(6)\} = 5 \\ \{(7),(8),(9)\} = 8 \end{cases}$$

$W_0(i,j)$ $W_1(i,j,0)$ $W_2(i,j,0)$

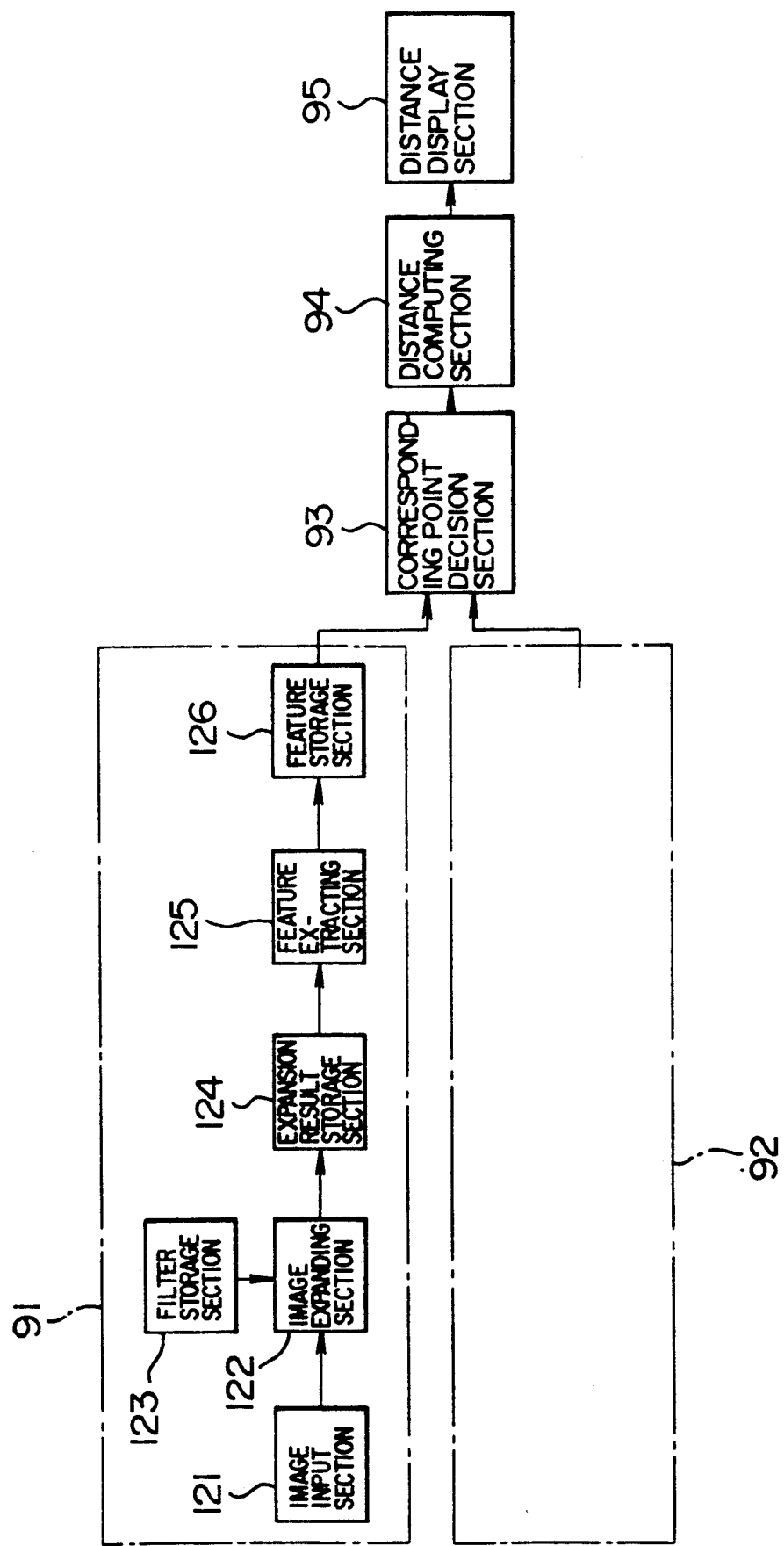

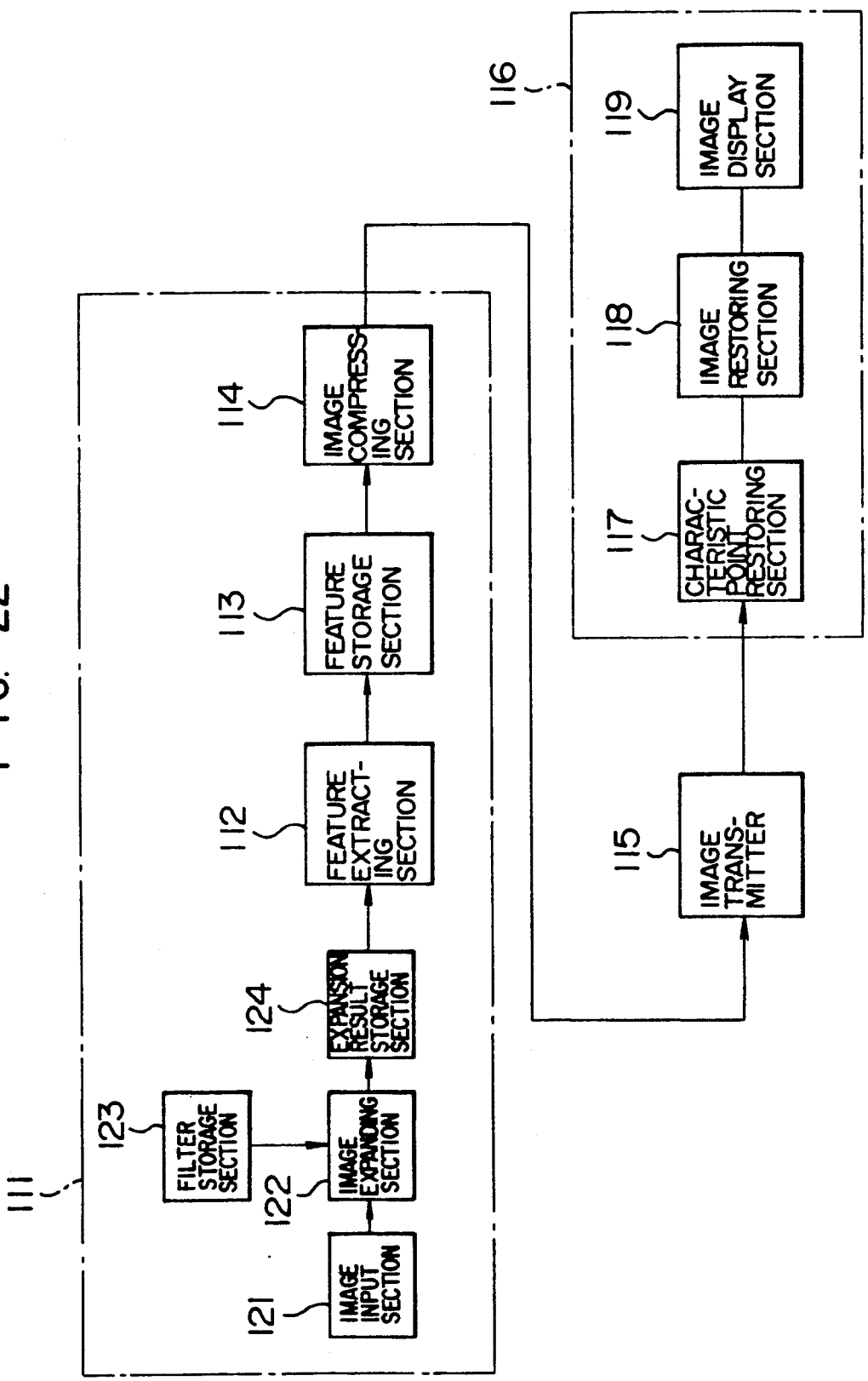

PROCESSOR FOR PATTERN DATA, MEASURED PROCESS INFORMATION, AND IMAGE INFORMATION

BACKGROUND OF THE INVENTION

The present invention relates to a processor for processing measured process information suitable for achieving a computer management or control of complicated processes such as a thermal process in an iron manufacturing furnace or a chemical reaction process in a chemical plant.

Furthermore, the present invention relates to an image information processing system suitable for a monitor system employing an industrial television (ITV), a visual system of a robot moving in an autonomic fashion, various measuring devices utilizing images, and recognition of graphics, characters, etc.

In many industrial manufacturing processes, a system measuring and controlling states of the system have been broadly adopted. In a typical system, for example, the PID control is achieved by use of a deviation between a state of a process and a target value thereof or an application method of an artificial or man-created intelligence in which rules of "if . . . then . . . " are applied to a quantity of a state of a process so as to attain a control quantity through an inference. In these control appartuses, the signal processing of measured process information has been limited to an arithmetic processing of instantaneous items of measured data such as a removal of a noise from measured data and a conversion of the measured data into physically significant numeric value.

Furthermore, a monitor device for processing an image attained from an image input unit such as an ITV so as to decide the presence or absence of an invading object, a system for extracting, from an image, information related to a distance and an image of a moving object, and an equipment for recognizing characters and graphics have been put into practice. The typical processing in an image processing apparatus employed in such a device is limited to the arithmetic processing to extract an edge, which will be described later, and to effect arithmetic processing by use of the edge. Namely, in the processing, for example, a portion or an edge where a brightness abruptly varies is extracted from the image to determine the presence or absence of an object based on a position of the edge and to attain a speed of a moving object from a change of the edge. In consequence, in order to recognize an image, a complicated processing has been necessary in which a histogram indicating a distribution of edges is generated to achieve a statistical processing or in which connective relationships between certain pixels associated with edges are sequentially checked to extract line segments so as to determine a direction of the line segments.

In the signal processing apparatus of the conventional technology, there has been a first problem that although the instantaneous state of measured data can be attained, it is difficult to represent a time-series change pattern thereof. The consequence, in the conventional technology, a stabilizing control can be achieved to overcome various disturbances in stationary process states occupying most part of the operation period; however, a nonstationary state or a sudden abnormality cannot be easily coped with and a control operation for the restoration is attended with difficulties. The operation of this kind has been manually conducted by the human operator.

On the other hand, in the image information processing apparatus of the conventional technology, there has been a second problem that although the positions of the edges can be attained, the contour formed with the edges cannot be easily expressed. In consequence, in the conventional image information processing apparatus, although a contour of an object can be extracted, recognition of the extracted object has remained a more difficult problem to solve.

SUMMARY OF THE INVENTION

It is therefore the first object of the present invention to develop a function, as supplementary technology to provide a control system for controlling a complicated system, to identify a changes in state of a pattern in a period of time from measured information, thereby solving the various problems above.

The second object of the present invention is to enable, as supplementary technology to recognize and to extract a particular object from image information, an identification of a brightness pattern of the image information to be achieved.

A measured process information processor to achieve the first object above includes a feature extracting section for achieving signal processing to extract a feature from measured information and an abstract expression section for converting or translating the feature into an abstract expression, thereby detecting significant information from measured values conventionally not utilized so as to employ the information for control.

In addition, the processor comprises a symbolizing section for extracting characteristic points from the measured information so as to subdivide the measured information into partitions at the characteristic points, to obtain an abstract representation of each partition, and to convert the abstract representation into symbols, and a causality inference section for inferring the causality of the measured information thus symbolized, thereby determining a control operation. As a result, significant information which has not been used in the measured information in the conventional technology is detected to be utilized as information for the control.

By providing the processor with a data storage section for accumulating therein the result obtained by symbolizing the measured information in the symbolizing section, the measured information can be efficiently stored therein. Moreover, when the processor is provided with a pattern matching section for achieving a symbolic matching on the measured information accumulated in the data storage section and a classifying/retrieving section for conducting classification and retrieval of the measured information based on a result of the matching, empirical knowledge necessary for the control can be easily extracted from the measured information of the process.

Furthermore, in order to achieve the second object above, the processor includes means for expanding image data supplied thereto into a polynomial in the neighborhood of each pixel, means for extracting as features of an image a local maximum value and a local minimum value from coefficients of the developed polynomial, means for generating, based on the features, a list of parallel line segments and a graph expressing a connective state of a line segment between end points of each line segment, means for storing therein features of an object in advance, and means for comparing a memory of the features with the list as well as with the graph to recognize the object, thereby easily recognizing an object in an image.

Moreover, the processor includes an image transmitting section provided with means for extracting information of pixels having the features of the image to compress the image, means for restoring characteristic points of the image from the compressed data of the image, and an image receiving section including means for conducting a quadratic interpolation based on the data of the characteristic points to restore the image, thereby effectively transmitting an image.

BRIEF DESCRIPTION OF THE DRAWINGS

These and other objects and advantages of the present invention will become apparent by reference to the following description and accompanying drawings wherein:

FIG. 1 is a schematic block diagram showing a first embodiment of a process control system according to the present invention;

FIGS. 4A and 4B are schematic diagram showing an example of conversion or translation rules;

FIG. 20 is a block diagram showing an example of the configuration of a distance measuring device according to the present invention;

FIG. 22 is a block diagram showing an example of the configuration of an image compression and transmission apparatus according to the present invention.

DESCRIPTION OF THE PREFERRED EMBODIMENTS

Figure 2:
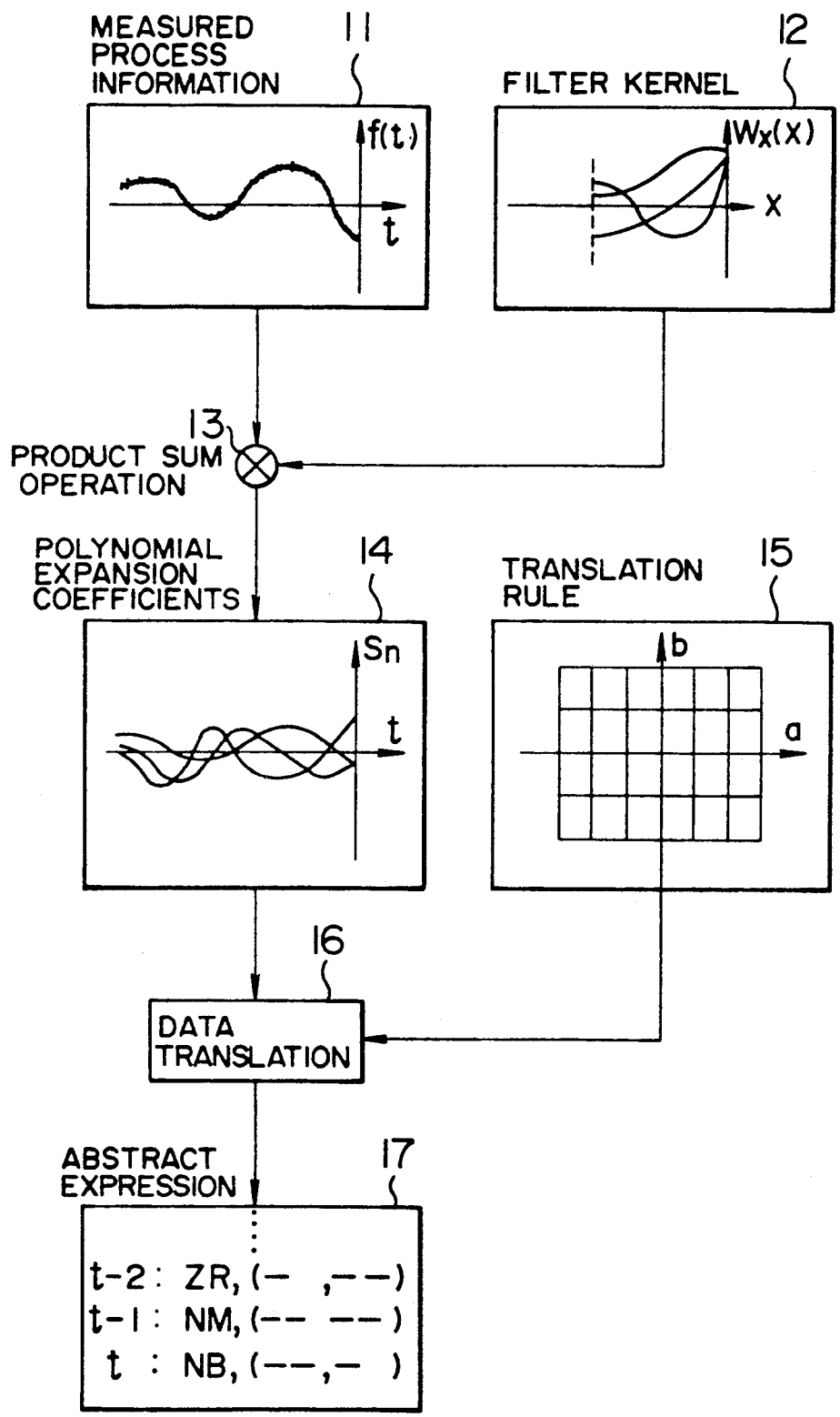
FIG. 2 is a block diagram showing a flow of processing of a signal processor according to the present invention.

Referring now to the drawings, description will be given of the various sections such as the feature extracting section of an embodiment of a process control system according to the present invention.

In the feature extracting section, for data of measured process information measured at respective points of time, a state change pattern in the neighborhood of a point including the data is resolved into a predetermined combination of appropriate polynomials. As a result, a noise of a measured value unexpressive with a polynomial can be removed, and features of the data can be expressed with coefficients combining by polynomials with each other. By sequentially processing data, which changes in a time-series fashion, at the respective points of time, a change pattern in which features of the time-series data are expressed is attained by use of the feature extracting section.

In the abstract expression section, based on the change pattern of the features of the time-series data produced from the feature extracting section, a predetermined combination of appropriate feature changes are translated or converted into an abstract expression.

As described above, the signal processor according to the present invention has a remarkable characteristic that the noise included in the measured value due to the nature of the process can be efficiently removed and an arbitrary abstract expression can be created for each measured data.

In addition, in the symbolizing section, characteristic points are extracted from the changes developed in the measured process information with respect to time so as to split the measured process information at the characteristic points, thereby achieving the symbolyzing operation. Through the processing above, a noise contained in the measured information is removed so as to attain a symbolic expression. Furthermore, the symbolic expression of the measured information facilitates estimation of causality and the like included in the measured information. This enables the control to be achieved by use of significant information contained in the measured information which has not been utilized in the conventional system.

With the provision of the data storage section for accumulating therein the measured information thus symbolized, the data to be accumulated is symbolically compressed; in consequence, the efficiency of the data accumulation is abruptly increased. Moreover, since the accumulated data is beforehand translated into symbols, judgement of analogy to be conducted by use of a symbolic pattern matching is facilitated. As a result, the classification and retrieval of the information measured in the past operations became possible, and hence by extracting empirical knowledge necessary for the control, the control performance can be considerably improved.

On the other hand, in the means for expanding an image into a polynomial, since a filter operation is conducted in the neighborhood of each pixel to obtain average expansion coefficients, the noise included in the image data is removed, thereby obtaining accurate expansion coefficients. In the means for extracting characteristic points of an image from the expansion coefficients, pixels respectively having the local maximum and minimum values in a direction in which the expansion relationship is maximum are extracted, thereby obtaining clear characteristic points. Since the characteristic points are classified depending on directions corresponding to the luminance change in the neighborhood, a set or list of parallel line segments and the end points of the segments can be easily extracted. Furthermore, relationships at the end points with respect to other line segments can also be obtained; consequently, creation of (a graph of) connective relationships of line segments is facilitated. This enables correspondences to be established between the results above and known features (list and graph) of an object, and hence an object can be easily recognized in an image. Expressing the features of an object in a list as well as in a graph makes it possible to extract a portion for which the features of the image do not match with those of a known object in the recognition result. In consequence, the provision of the means for re-extracting such unmatched features helps improve the object recognition ratio.

The number of characteristic points of the image is quite smaller than the total number of pixels of the original image. Consequently, by use of the means for extracting information of pixels related to the characteristic points, the image information can be remarkably compressed. Moreover, through an operation to restore the characteristic points from the compressed image information to conduct an interpolation in a quadratic manner, the system can restore an image with a reduced deterioration as compared with the original image.

Referring next to FIGS. 1 to 6B, a description will be given of the first embodiment of a signal processor for processing measured process information according to the present invention. FIG. 1 is a block diagram showing an embodiment of a process control system employing a signal processor according to the present invention.

In the configuration of FIG. 1, process data including measured information related to a process 10 is collected by a process data section 1 having an input/output system so as to store the process data in a data accumulator section 2. The measured information is then processed by a signal processor 3, which comprises a feature extracting section 4 for extracting features from the measured information, an abstract expression section 5 for translating the features into an abstract expression, a parameter storage section 6 for storing therein a filter kernel to be used in the feature extracting section 4, and an abstract information storage section 7 for storing therein translation rules linking the abstract expression to the features to be utilized in the abstract expression section 5. Furthermore, the information produced from the abstract expression section 5 is processed by a dedicated controller 8 to control the process 10.

The information from the abstract expression section 5 is fed to a man-machine interface 9, which determines the storage contents of the parameter storage section 6 and the abstract information storage section 7 and a control content of the dedicated controller 8 by use of the information. The signal processor 3 includes components such as a microcomputer circuit and a software system materialized in a read-only memory (ROM).

The operation of the process control system of FIG. 1 associated with the configuration above will be described in conjunction with cases where the control is achieved and where the control apparatus is designed.

In the control operation, the signal processor 3 conducts the following operations (a) and (b).

(a) The feature extracting section 4 filters the measured process information collected by the process data section 1 by use of the filter kernel beforehand stored in the parameter storage section 6, thereby expanding the measured information into a polynomial.

(b) The abstract expression section 5 converts the measured information into an abstract expression by use of expansion coefficients for the polynomial obtained from the feature extraction section 4 and the translation rules stored in the abstract information storage section 7, thereby transferring the abstract expression to the dedicated controller 8.

The operations (a) and (b) will be next further described in detail. First, a description will be given in detail of the operation (a) with reference to FIG. 2. Between the measured process information 11 obtained from the process data section 1 and a filter kernel 12 stored in the parameter storage section 6, a product sum operation 13 is conducted to expand the information into a polynomial. The filter kernel 12 is determined in the following method.

Assume that the change with respect to time of the measured process information to be expanded is expressed as f(t) and that a polynomial of degree n is represented as $H_n(x)$ (n=0, 1, 2, ... ). For simplicity of explanation, the present time t is set to 0 and description will be given of a case where f(t) is expanded up to the point t=0. Moreover, a weight function to obtain a smaller value for a larger distance from x=0 is to be expressed as E(x).

The polynomial $H_n(x)$ of degree n employed for the expansion of the measured process information f(t) is determined to satisfy the following expressions (1) and (2). The polynomial $H_n(x)$ is uniquely determined as follows when E(x) is given.

$$\begin{cases} \sum_{x=a}^{0} \{H_m(x)H_n(x)\}E(x) = 0 \quad (m \neq n) & (1) \\ \sum_{x=a}^{0} \{H_n(x)\}^2 E(x) = 1 & (2) \end{cases}$$

Where, a is a constant determining a range in which the measured process information f(t) is expanded. In this situation, let us obtain a filter kernel $W_n(x)$ (n=0, 1, 2, ...) as determined by the following expression (3).

$$W_n(x) = H_n(x) E(x)$$

$$(x = a, a + 1, \ldots, 0) \quad (3)$$

Assume here that the product sum between the measured process information f(t) up to t=0 and the kernel $W_n(x)$ is $S_n$.

$$S_n = \sum_{x=a}^{0} f(x) \cdot W_n(x), \quad (4)$$

$$n = 0, 1, 2, \ldots$$

Under this condition, the measured process information $f(t)$ is expanded into a polynomial as follows.

$$f(t) = S_0 H_0(t) + S_1 H_1(t) + S_2 H_2(t) \quad (5)$$

A description will be given in detail of the expression (5) which holds in this case. Assume that a system of orthonormal functions in a situation where the expressions (1) and (2) are satisfied is $\Psi_n(x)$ ($n=0, 1, 2, \ldots$), then $\Psi_n(x)$ is expressed as follows.

$$\Psi_n(x) = H_n(x) \{E(x)\}^{\frac{1}{2}} \quad (6)$$

By use of the system orthonormal functions, $f(t)\{E(t)\}^{\frac{1}{2}}$ is expanded into the following expression (7).

$$f(t) \cdot \{E(t)\}^{\frac{1}{2}} = A_0 \Psi_0(t) + A_1 \Psi_1(t) + A_2 \Psi_2(t) \quad (7)$$

Where, the expansion coefficient $A_n$ ($n=0, 1, 2, \ldots$) is expressed as follows.

$$A_n \sum_{x=a}^{0} [f(x)\{E(x)\}^{\frac{1}{2}} \Psi_n(x)] \quad (8)$$

Let us transform the expansion coefficient $A_n$.

$$\begin{aligned} A_n &= \sum_{x=a}^{0} [f(x)\{E(x)\}^{\frac{1}{2}} H_n(x)\{E(x)\}^{\frac{1}{2}}] \\ &= \sum_{x=a}^{0} [f(x) H_n(x) E(x)] \\ &= \sum_{x=a}^{0} [f(x) W_n(x)] = S_n \end{aligned} \quad (9)$$

Namely, the result of the product sum operation $S_n$ becomes identical to the expansion coefficient $A_n$. In consequence, applying the expressions (6) and (9) to the expression (7), the following expression (10) results.

$$f(t)\{E(t)\}^{\frac{1}{2}} = [S_0 H_0(t) + S_1 H_1(t) + S_2 H_2(t) + \ldots ]\{E(t)\}^{\frac{1}{2}} \quad (10)$$

This is reduced as follows, and hence the expression (5) holds.

$$f(t) = S_0 H_0(t) + S_1 H_1(t) + S_2 H_2(t) + \quad (11)$$

Figure 3:
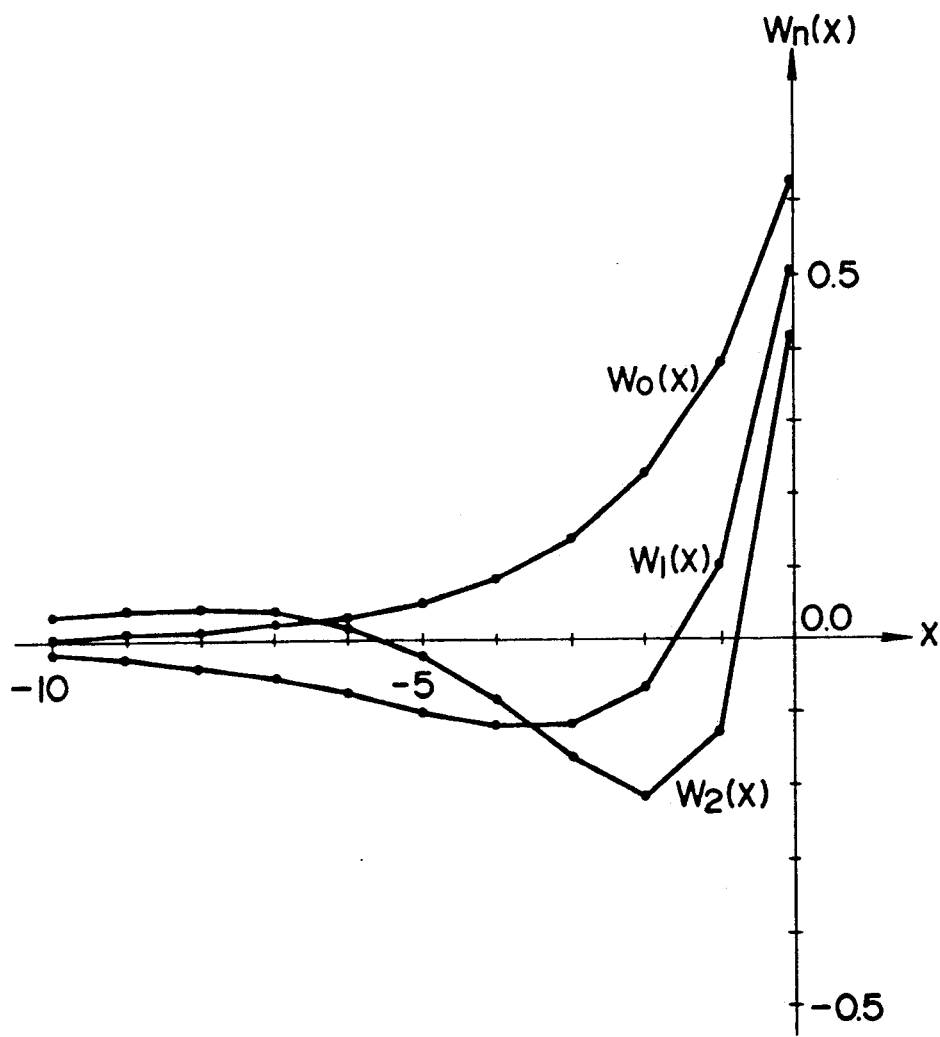
FIG. 3 is a graph showing an example of a filter kernel.

FIG. 3 shows a filter $W_n(x)$ ($n=0, 1, 2$) in a case where the following exponential function is used an example of the weight function, $\sigma = 2.0$, and the constant a to determine the expansion range is set to $-10$.

$$E(x) = \exp\left(\frac{x}{\sigma}\right) \quad (12)$$

As can be seen from the form of the filter kernel $W_n(x)$ of FIG. 3; $W_0(x)$, $W_1(x)$, and $W_2(x)$ are considered to supply an average value, an average gradient, and an average horizontal wave change in the neighborhood of $x=0$.

Referring next to FIG. 2, a description will be given in detail of the operation (b) above. The abstract expression section 5 collates polynomial expansion coefficients 14 sent from the feature extracting section 4 with translation rules 15 stored in the abstract information storage section 7 so as to achieve a data translation 16 to obtain an abstract expression 17. FIG. 4A and 4B show details of the translation rules 15. In the expansion coefficients 14, $S_0$ indicates a level of a process state. Depending on the value of $S_0$ as shown in FIG. 4A, an average level of the process state can be translated into an abstract expression. The abstract expressions of FIGS. 4A and 4B respectively are associated with the following abbreviations.

PB: Positive big
PM: Positive medium
PS: Positive small
ZR: Zero (small value)
NS: Negative small
NM: Negative medium
NB: Negative big Furthermore, in the expansion coefficients 14, $S_1$ and $S_2$ respectively denote an average gradient and an average degree of horizontal wave change respectively of the process state. In consequence, as shown in FIG. 4B, based on a combination of the expansion coefficients $S_1$ and $S_2$, an abstract expression of a change in the process state can be obtained. Let us assume that a change of the process state from $\alpha$ to $\beta$ is represented by $(\alpha, \beta)$, where the combination "$\alpha, \beta$" stands for one of the following abstract expressions.

++: Abrupt increase
+: Increase
0: Equilibrium
−: Decrease
−−: Abrupt decrease

The abstract expression 17 naturally includes, in addition to the qualititative expression method as described above, a fuzzy expression conforming to a standard such as a membership function of the fuzzy logic or the like beforehand supplied to the system.

The abstract expression 17 created through the operations in FIGS. 4A and 4B is fed to the dedicated controller 8 so as to determine the control quantity on the process 10. The dedicated controller 8 executes a processing as follows.

(i) Identification of state

Based on the abstract expression 17, the controller 8 determines whether or not the process is in a stationary state.

(ii) Stabilizing control

When the process is judged to be in the stationary state, the controller 8 achieves a stabilizing control in conformity with "a qualitative causality" registered to the controller 8.

(iii) Abnormality restoring control

When the process is judged to be in other than the stationary state or in an abnormal state, the controller conducts an inference based on a restore processing rule registered to the controller 8 so as to determine a restoring control operation.

In order to enhance the function of the dedicated controller 8, a one-step forecast value of the process state may be included in the outputs from the signal processor 3. The one-step forecast value of the process state can be easily attained by assigning $t+1$ for t in the expression (11). As a result, the processing steps (i) to (iii) can be achieved depending on the forecast of the process state.

In the control operation, the man-machine interface 9 edits, in response to an information acquisition request issued from an operator, a process engineer, a process manager, or the like, the abstract expression received from the abstract expression section 5 so as to supply the person requesting the information with a result of the edit operation by use of report means such as a cathode ray tube (CRT). As a result, the person who has issued the request can obtain the process state in an abstract expression (in a language, symbols, etc.) to be easily understood by a human, the process states including the abnormal state can be appropriately identified at a high speed.

The operation of the control system of FIG. 1 in the control operation has been described. Next, a description will be given of operations of the respective components of FIG. 1 in the control system design.

When designing the control system, the signal processor 3 conducts the following operations (c) and (d).

(c) The feature extracting section 4 filters signals of the measured process information 11 stored in the data accumulator section 2 by use of the filter kernel 12 beforehand stored in the parameter storage section 6, thereby developing the measured process information 11 into a polynomial.

(d) The abstract expression section 5 processes the measured information 11 by use of the polynomial expansion coefficients attained from the feature extracting section 4 and the translation rules 15 stored in the abstract information storage section 7 so as to obtain an abstract expression, which is then sent to the man-machine interface.

Next, a description will be given in detail of the operation of the man-machine interface 9. The manmachine interface 9 conducts the following operation steps.

(iv) In order to obtain an abstract expression depending on a special state of the process, the interface 9 updates the filter kernel 12 stored in the parameter storage section 6 and the translation rules 15 kept in the abstract information storage section 7.

(v) By use of the abstract expression of multiple variables representing a process state, the interface 9 obtains "a qualitative causality" between the variables based on the correspondences between the variables including a time delay so as to register the causality to the dedicated controller 8.

(vi) Knowledge related to a control of an objective process possessed by experts is registered as rules in a form of "if . . . then . . . " to the dedicated controller 8.

The operation steps (iv) and (v) may be interactively achieved in a trial-and-error fashion or may be automatically conducted by use of an expert system related to a processing procedure. The operation step (vi) is achieved in an interactive manner.

Figure 5:
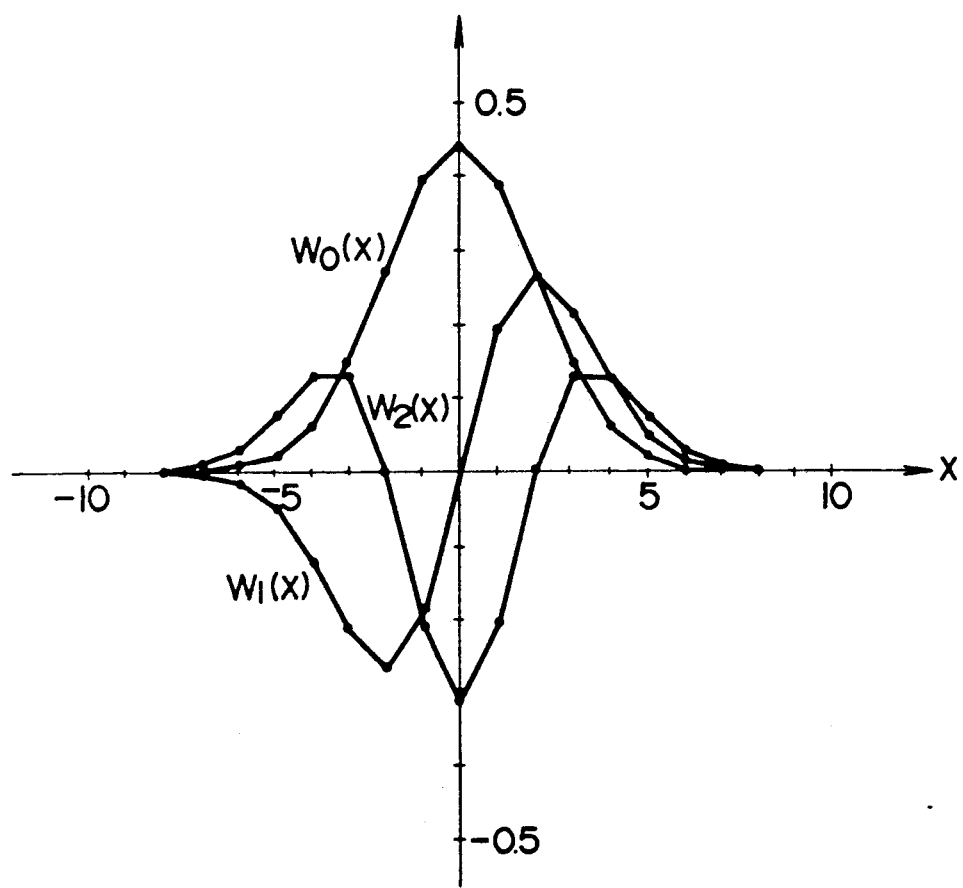
FIG. 5 is a graph showing another example of a filter kernel.

The operations of the constituent sections of the signal processor in the control apparatus design have been described. When designing a control apparatus, the measured process information is beforehand stored in the data accumulator section 2; consequently, the filter kernel 12 of the parameter storage section 6 may have a center on x=0 so as to expand toward both directions therefrom. FIG. 5 shows a case where the zone of x for the total operation Σ is conducted in the expressions (1), (2), (4), (8), and (9) ranges from −10 to 10, E(x) of the expression (12) is as follows, and σ is set to 2.

$$E(x) = \exp\left(-\frac{x^2}{2\sigma^2}\right) \tag{13}$$

Figure 6A:
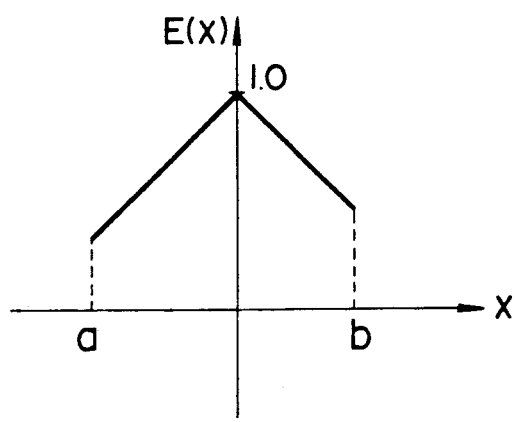
FIGS. 6A and 6B are a diagram showing an example of a weight function to determine a filter kernel.

As the weight function E(x), in addition to the exponential functions contained in the expressions (12) and (13), an arbitrary function may be utilized. For example, the following lines E(x) as shown in FIG. 6A may be employed.

$$E(x) = 1 \pm x/\sigma \tag{14}$$

Figure 6B:
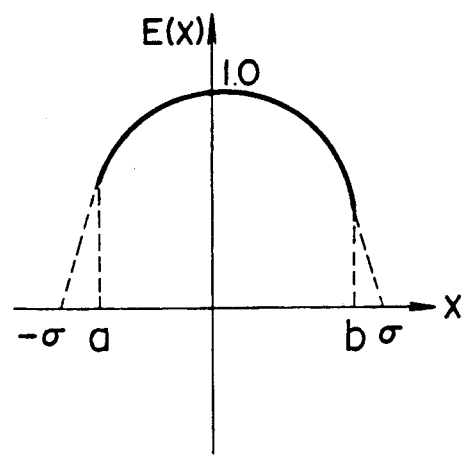

Moreover, the following parabola E(x) as shown in FIG. 6B may be used.

$$E(x) = \sigma^2 - X^2 \tag{15}$$

The value of the parameter σ in each of these functions is required to be determined depending on the magnitude of the noise contained in the measured data and the sampling period thereof. The maximum value of the degree n of the polynomial employed to the features need only range from two to four.

In the example the embodiment above each point of time associated with the measured data is utilized as the standard or reference to expand the information into a polynomial. As an alternative embodiment, it is also naturally possible to split the data into partitions having an arbitrary interval length such that the measured data of each interval is developed into a polynomial so as to produce an abstract expression for each interval, thereby attaining the similar function.

Figure 7:
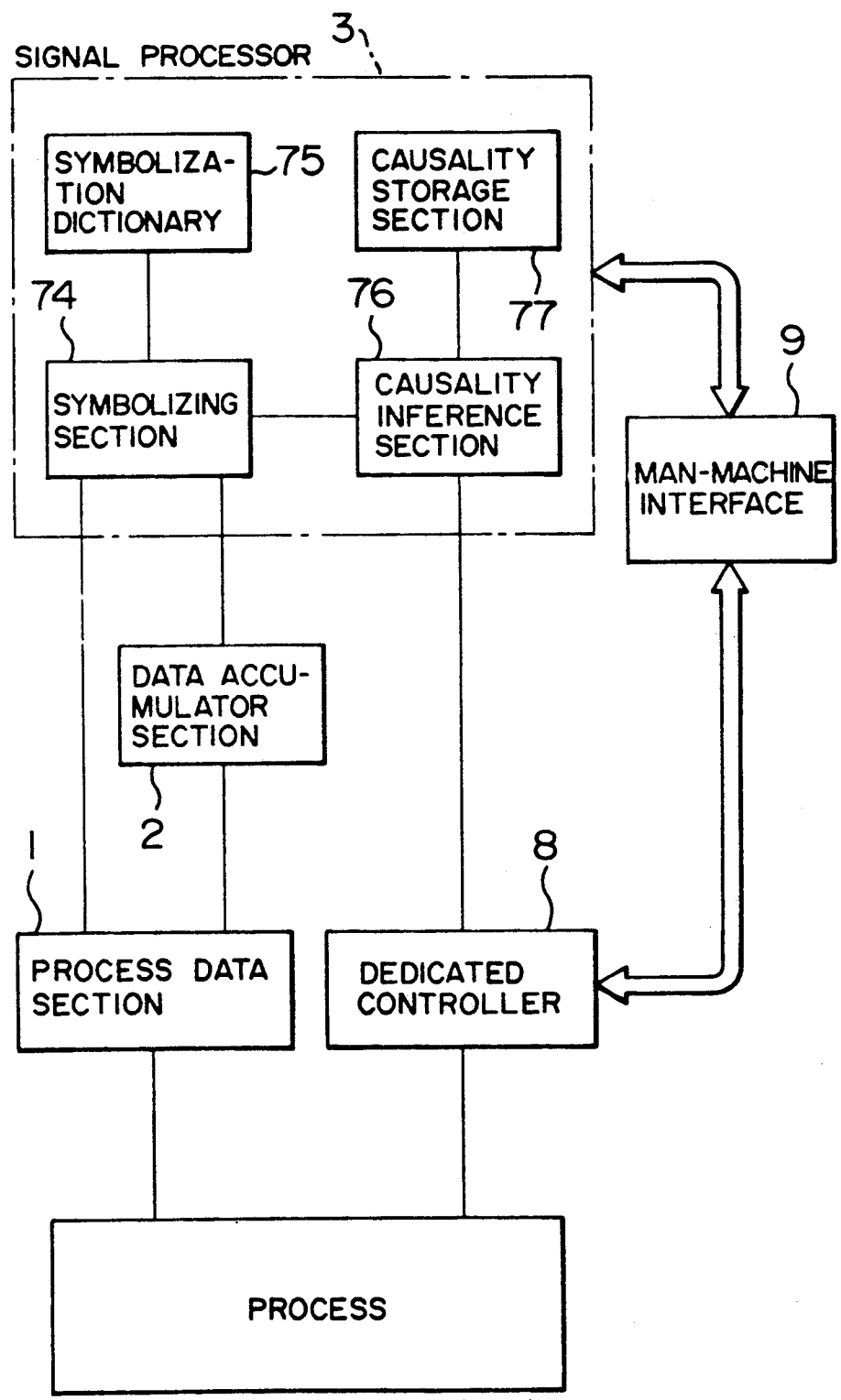
FIG. 7 is a schematic block diagram showing a second embodiment of a process control system according to the present invention.

Referring next to FIGS. 7 to 11, a description will be given of the second embodiment of a signal processor for processing measured process information according to the present invention. FIG. 7 is a block diagram showing an embodiment of a control apparatus employing the signal processor according to the present invention. In this system, data from a process data section 1 having an input/output system to collect measured information is stored in a data accumulator section 2. The configuration includes a signal processor 3, which comprises a symbolyzing section 74 for extracting features from the measured information so as to convert or to translate the information into symbols, a symbolyzation dictionary 75 for storing therein translation rules linking a filter kernel, features, and symbols to be used in the symbolyzing section 74, a causality inference section 76 for conducting an inference to obtain a causality between process data items, and a causality storage section 77 for storing therein a causality between the process data items. Moreover, this system includes a dedicated controller section 8 including an integrated microcomputer circuit and the like, a CRT for displaying thereon a control output from the dedicated controller 8, and a man-machine interface section 9 having a printer or the like. The signal processor 3 comprises electric circuit including a microcomputer circuits and a software system materialized in an ROM.

Next, a description will be given of the operation of the process control apparatus having the constitution above.

The symbolizing section 74 achieves the processing (a) to (c) as follows.

(a) By use of the filter kernel beforehand stored in the symbolizing dictionary 75, a signal filtering operation is conducted on the measured process information collected by the process data section 1 so as to extract characteristic points from the measured process data.

(b) The measured process information is split into partitions or intervals at the characteristic points determined in the processing (a) so as to translate each partition into an abstract expression.

(c) A sequence of abstract expressions obtained through the processing (b) in a time series fashion is further converted into symbolic expressions such as abstract step changes, impulse changes, and oscillating or vibrating states.

Figure 8:
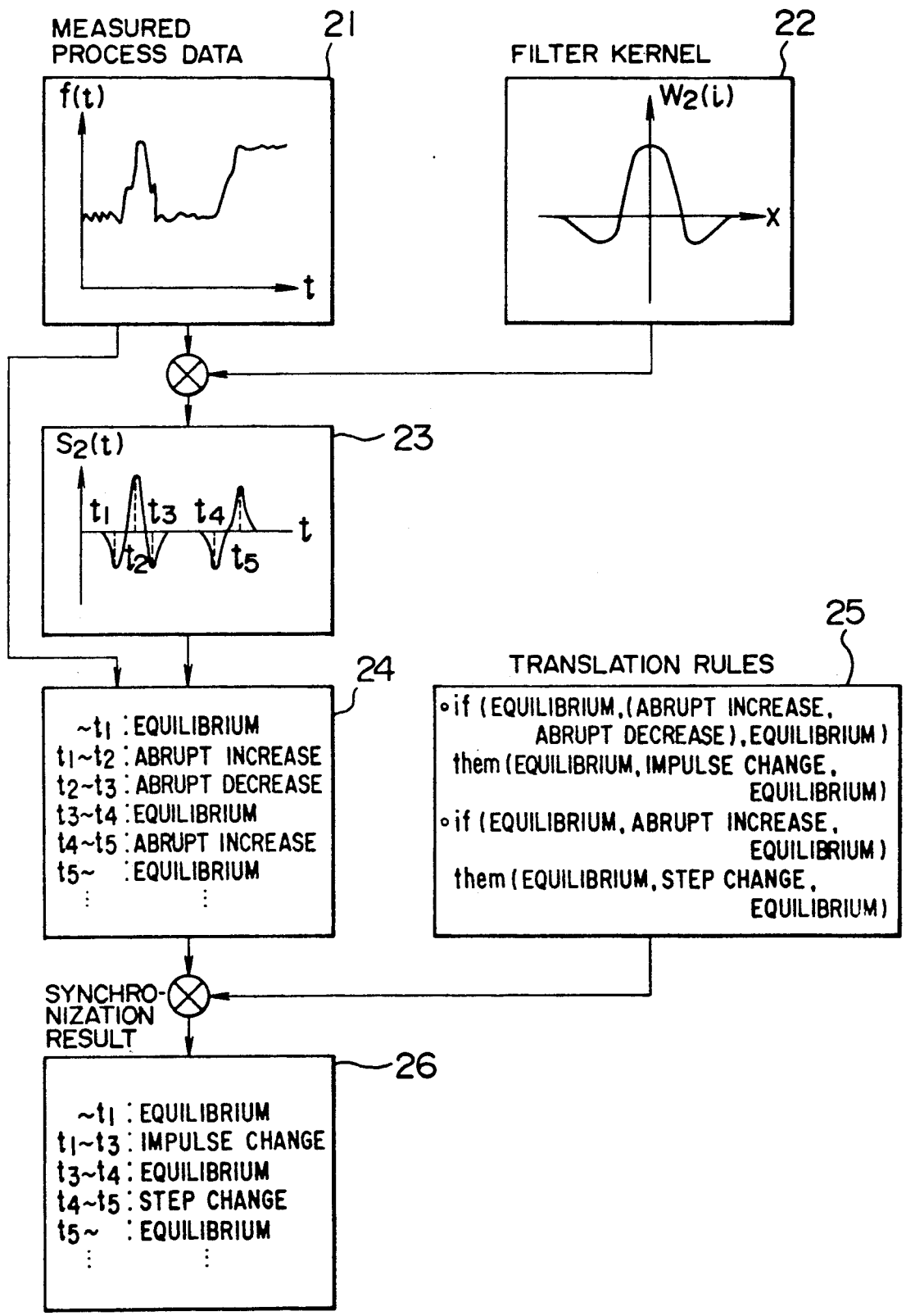
FIG. 8 is a block diagram showing a flow of processing of a symbolizing section 74.

Referring next to FIG. 8, a description will be given in detail of the processing (a) to (c) of the symbolizing section 74. First, a product sum is computed between the measured process data 21 obtained from the process data section 1 or stored in the data accumulator section 2 and a filter kernel 22 kept in the symbolizing dictionary 75, thereby extracting characteristic points from the measured process data 21.

The filter kernel 22 is as follows, for example.

$$W_2(i) = \frac{1}{4\sqrt{2\pi} \ \sigma^3} (i_2 - \sigma^2) \cdot \exp\left(-\frac{i^2}{2\sigma^2}\right) \quad (16)$$

$$(i = -a, -a+1, \ldots, a)$$

Where, $\sigma$ is an appropriate constant and a is a constant indicating a region or a width of the filter.

The product sum between the measured process data 21 and the filter kernel 22 is conducted through an expression (17).

$$S_2(t) = \sum_{i=-a}^{a} f(t+i) \cdot W_2(i) \quad (17)$$

Based on a result 23 of the product sum operation, the system extracts characteristic points satisfying an expression (18) in the following cases.

(i) $S_2(t) \geq \alpha$ $$\begin{cases} S_2(t) \geq S_2(t-1) \\ S_2(t) \geq S_2(t+1) \end{cases} \quad (18)$$

(ii) $S_2(t) \leq -\alpha$ $$\begin{cases} S_2(t) \leq S_2(t-1) \\ S_2(t) \leq S_2(t+1) \end{cases} \quad (19)$$

In the case of the embodiment of FIG. 8, by use of the product sum result 23, points of time $t_1$ to $t_5$ can be extracted as characteristic points. The processing (a) of the symbolizing section 74 has been described in detail.

Next, a description will be given in detail of the processing (b) of the symbolizing section 74. First, an average value of the measured process data in the vicinity of each of the characteristic points is computed by use of an expression (20).

$$\begin{cases} S_0(t_j) = \sum_{i=-a}^{a} f(t_j + i) \cdot W_0(i) \\ W_0(i) = \frac{1}{\sqrt{2\pi} \ \sigma} \cdot \exp\left(-\frac{i^2}{2\sigma^2}\right) \\ (i = -a, -a+1, \ldots, a) \end{cases} \quad (20)$$

Where, $S_0(t_j)$ is a mean value or an average value of the measured process data in the neighborhood of a characteristic point $t_j$ and $W_0(i)$ denotes a filter kernel stored in the symbolizing dictionary 75.

Through an execution of the operation represented by an expression (21) at each characteristic point, a measured value $E(t_j)$ from which the noise contained in the measured process data has been removed can be obtained at the characteristic point.

$$E(t_j) = \frac{1}{\sqrt{2\pi} \ \sigma} \cdot S_0(t_j) - \frac{1}{4\sqrt{2\pi} \ \sigma} \cdot S_2(t_j) \quad (21)$$

The expression (21) means that by use of a mean value $S_0(t_j)$ of the measured process data f(t) in the neighborhood of the characteristic point $t_j$ and an average horizontal wave change value $S_2(t_j)$ thereof, a state in the vicinity of the characteristic point $t_j$ is restored such that assuming i to be 0, the value is obtained at the characteristic point $t_j$.

Next, by use of the measured value $E(t_j)$ at the characteristic point, the system obtains a gradient of the measured process data in an interval between characteristic points based on an expression (22).

$$G(t_j, t_{j+1}) = \frac{E(t_{j+1}) - E(t_j)}{t_{j+1} - t_j} \quad (22)$$

Where, $G(t_j, t_{j+1})$ stands for a gradient in an interval between characteristic points $t_j$ and $t_{j+1}$. With the gradient $G(t_j, t_{j+1})$, each interval between the characteristic points can be translated into an abstract expression. For example, assuming that the following translation rules are stored in the symbolizing dictionary 75.

(i) $G(t_j, t_{j+1}) \geq l_2$ ... Abrupt increase
(ii) $l_1 \leq G(t_j, t_{j+1}) \, l_2$ ... Increase
(iii) $-l_1 < G(t_j, t_{j+1}) < l_1$ ... Equilibrium
(iv) $-l_2 < G(t_j, t_{j+1}) \leq -l_1$ ... Decrease
(v) $G(t_j, t_{j+1}) \leq -l_1$ ... Abrupt decrease The rules are applied to the result of the operation of the expression (22) so as to obtain an abstract expression 24 for each interval. The processing (b) of the symbolizing section 74 has been described in detail.

Next, the processing (c) of the symbolizing section 74 will be described in detail. The abstract expression for each interval between the characteristic points is processed by use of translation rules stored in the symbolizing dictionary 75 to produce symbolic expressions. As the translation rules, for example, rules in the form of "if ... then ..." are stored in association with symbols to be represented.

(i) if (Equilibrium, (Abrupt increase, Abrupt decrease), Equilibrium) then (Equilibrium, Impulse change, Equilibrium)
(ii) if (Equilibrium, Abrupt increase, Equilibrium) then (Equilibrium, Step change, Equilibrium)
(iii) if (#, (Abrupt increase, Abrupt decrease))then (Oscillation)

In the parentheses of the if part of this format, abstract expressions are arranged in a time-series fashion. This representation indicates that when a series of abstract expressions in the if part exist in the abstract expression 24, the expressions in the parentheses are translated into a sequence of symbols in the parentheses of the then part. The number mark # used in the if part of the translation rule (iii) means that the abstract expression in the parentheses following the mark may reapeatedly appear as many times necessary. The processing (c) of the symbolizing section 74 has been described in detail.

Figure 9:
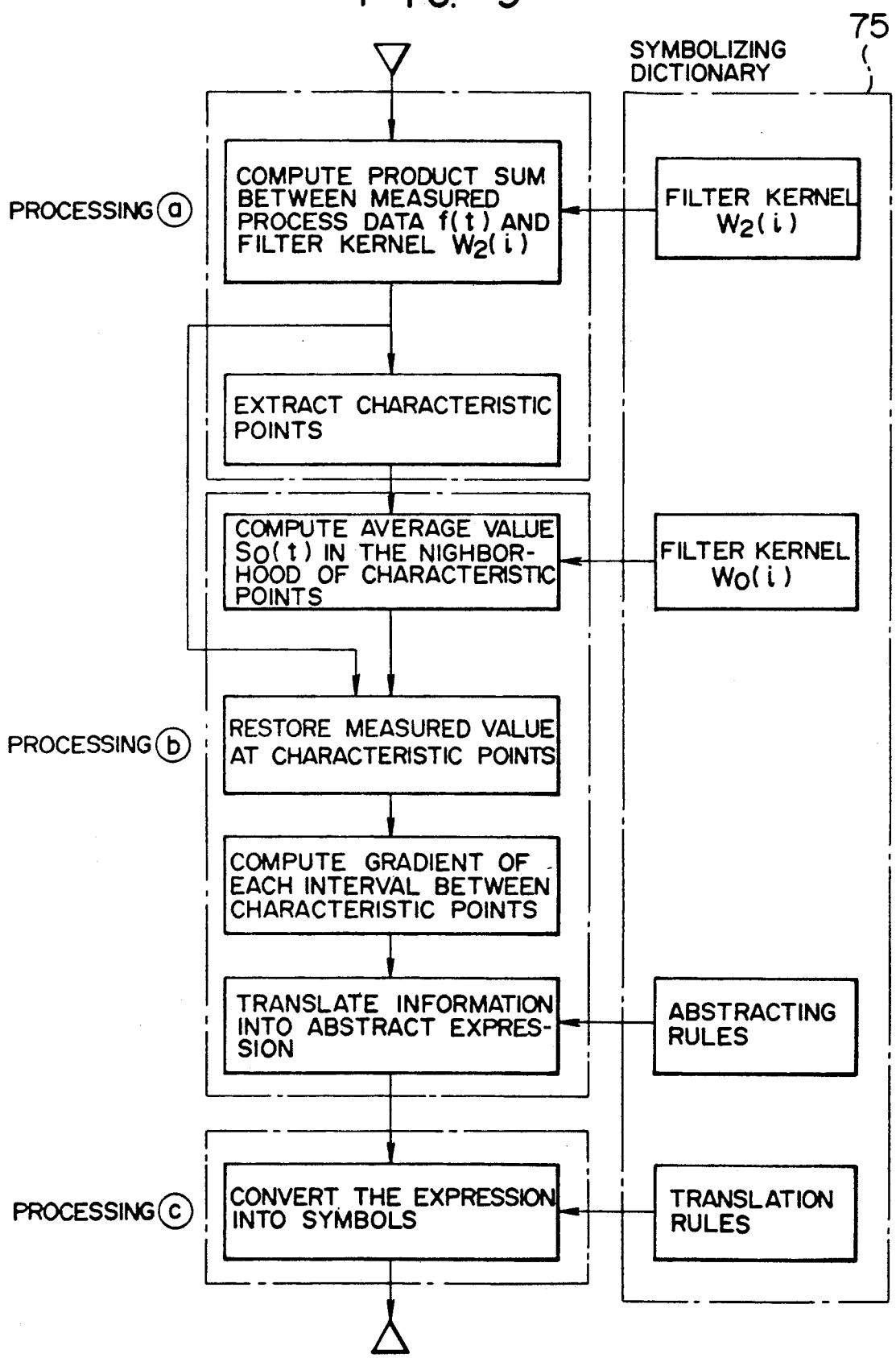
FIG. 9 is a flowchart showing a processing procedure of the symbolizing section 74.

FIG. 9 shows a flowchart of the processing (a) to (c) of the symbolizing section 74. In the description of this embodiment, $\sigma$ of the filter kernels $W_2(i)$ and $W_0(i)$ respectively of the expressions (16) and (20) has been assumed to be a constant. In a case where the measured process data is associated with high-speed and low-speed changes to develop complicated variations, the processing (a) and (b) may be executed with several different kinds of $\sigma$ so as to obtain an integrated data of the respective results.

Furthermore, the abstract and symbolic expressions in the symbolizing section 74 may naturally include, in addition to the qualitative expression method described above, a fuzzy representation based on the standard such as a membership of a fuzzy logic beforehand supplied to the system.

Figure 10:
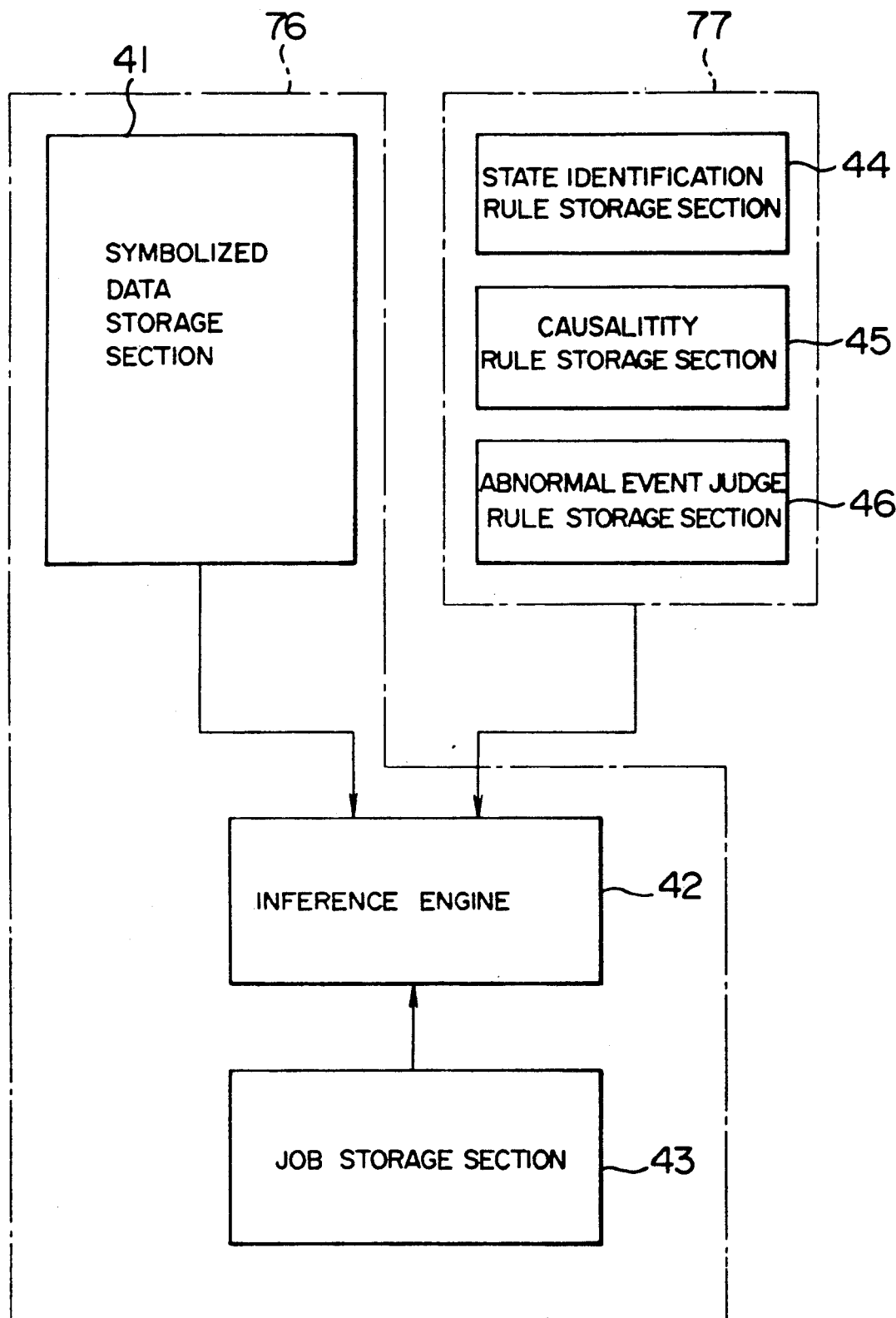
FIG. 10 is a block diagram showing a causality inference section 76 and a causality storage section 77.

A description will be given here in detail of the operation of the causality inference sertion 76 and the causality storage section 77. As shown in FIG. 10, the causality inference section 76 includes a symbolized data storage section 41, an inference engine 42, and a job storage section 43. The causality storage section 77 comprises a state indentification rule storage section 44, a causality rule storage section 45, and an abnormal event judge rule storage section 46.

Various process data symbolized in the symbolizing section 74 are stored in the symbolized data storage section 41. The inference engine 42 executes the following processing.

(i) Identification of state

Based on the contents respectively of the symbolized data storage section 41 and the state identification rule storage section 44, the inference engine 42 judges to determine whether or not the process is in the stationary state.

(ii) Stabilizing control

When the process is determined to be in the stationary state as a result of the judgement, by use of the content of the causality rule storage section 45, the inference engine 42 determines a control parameter for a stabilizing control according to the causality.

(iii) Abnormality restoring control

When the process is determined to be in other than the stationary state or in the abnormal state as a result of the judgement, by use of the content of the abnormal event judge rule storage section 46, the inference engine 42 determines the abnormal event so as to decide a restoring control associated with the abnormal event.

The job storage section is loaded with a temporary hypothesis obtained in the inference engine 42. The hypothesis is updated through an inference procedure.

The dedicated controller 8 generates various control instructions for a process control based on the results of processing achieved by the causality inference section 76, thereby executing the process control.

The man-machine interface 9 notifies, in response to an information acquisition request from an operator, a process engineer, a process manager, or the like, such information items as a result obtained by editing the symbolic expression from the symbolizing section 74 and a process state attained from the causality inference section 74 by use of a CRT or the like to the person who has issued the request. As a result, the pertinent person can attain the process state in an abstract expression (a language, symbols, and the like) to be easily understood by a human, which enables the abnormal state and the like to be appropriately identified at a high speed.

Figure 11:
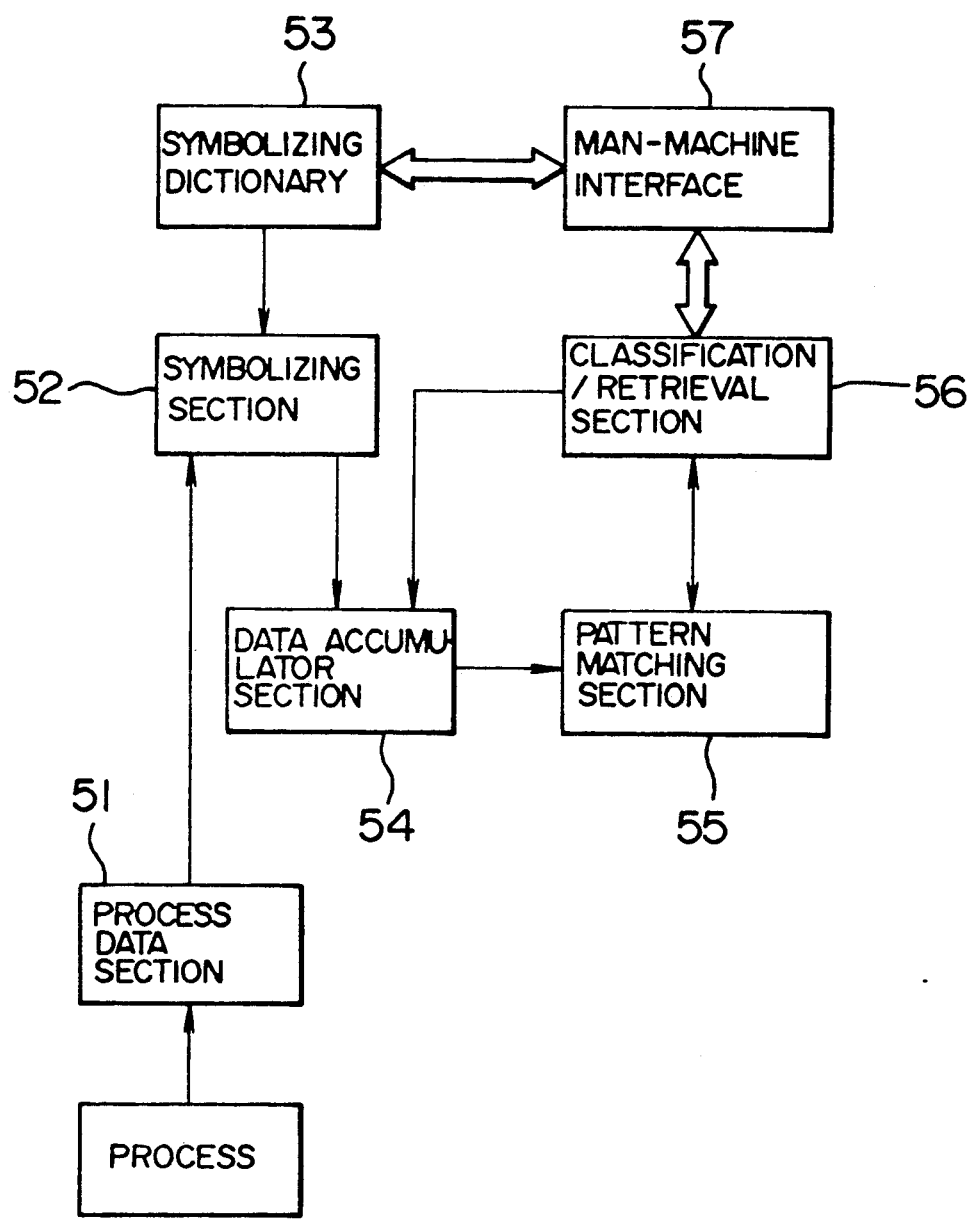
FIG. 11 is a block diagram showing the constitution of an alternative embodiment according to the present invention.

FIG. 11 is a block diagram showing an alternative embodiment of the signal processor in accordance with the present invention. The system includes a process data section 51 having an input/output system to collect measured information, a symbolizing section 52 for extracting features from the measured information to translate the information into symbols, and a symbolizing dictionary 53 for storing therein translation rules to be used in the symbolizing section 52 for the translation associated with a filter kernel and the symbols.

In the configuration, the process data section 51, the symbolizing section 52, and the symbolizing dictionary 53 respectively have the same functions as the corresponding components of FIG. 7.

Various measured data symbolized in the symbolzing section 52 are stored in the data storage section 54. In order to symbolically store the measured data in a compressed state, it is possible to efficiently use a storage device of a data accumulator section 54.

The system further includes a pattern matching section 55, which compares a standard pattern stored in a classification/retrieval section 56 via a man-machine interface 57 with measured data accumulated in the data accumulator section 54 so as to compute a symbolic similarity therebetween. As a result, a great amount of measured data accumulated in the data accumulator section 54 can be effectively classified and hence can be retrieved, which enables empirical knowledge necessary for the control to be extracted from the measured information accumulated through the operations conducted in the past.

Figure 12:
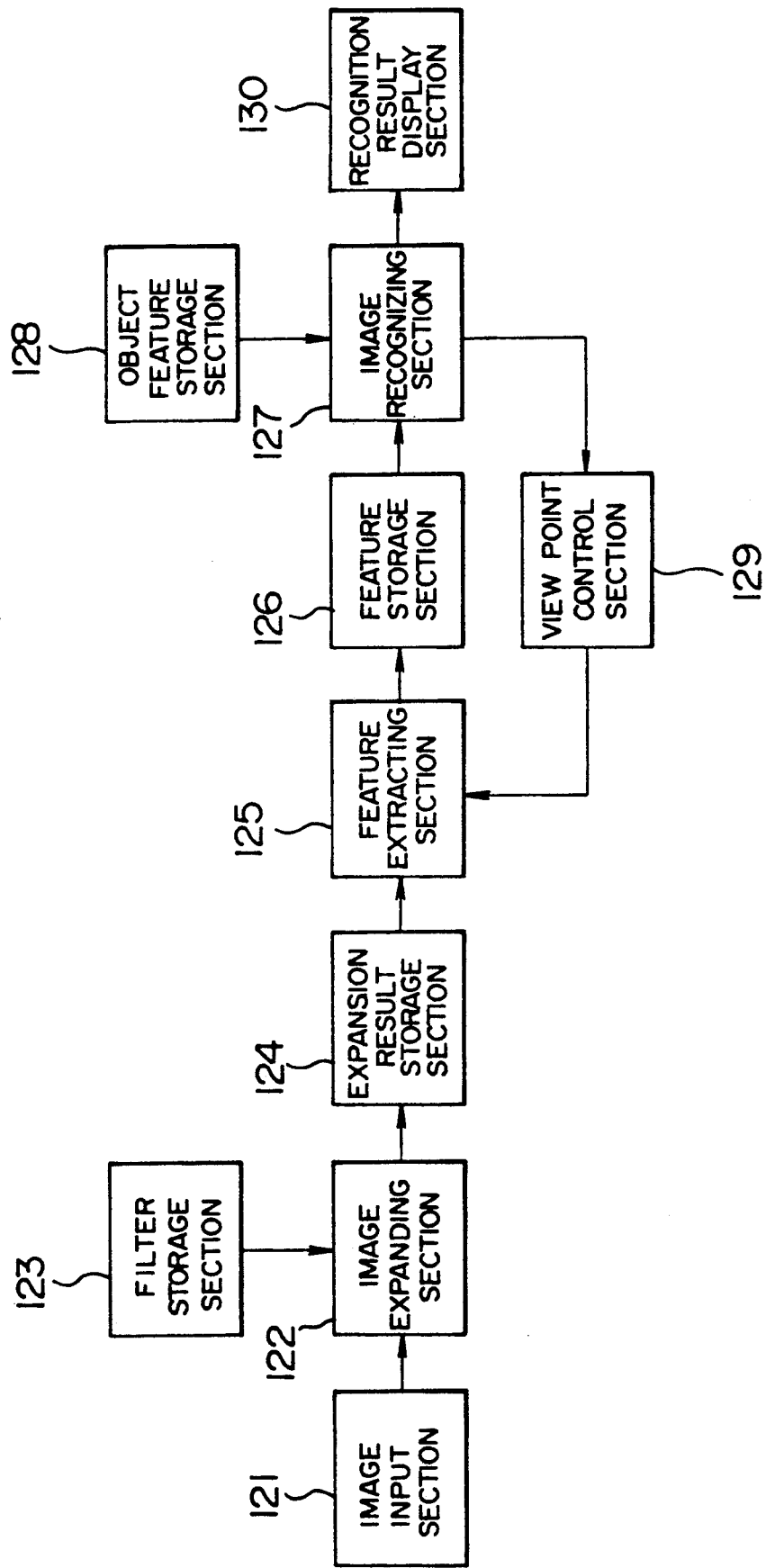
FIG. 12 is a block diagram showing the constitution of a third embodiment according to the present invention.

Referring next to FIGS. 12 to 22, a description will be given of the third embodiment according to the present invention. FIG. 12 is a block diagram showing the third embodiment according to the present invention. This configuration includes an image input section 121 having such an optimal reader to input an image as a television camera, an image scanner, or a facsimile and an analog-to-digital (A/D) converter to convert analog information into digital information, an image expanding section 122 for filtering image information to develop the information into predetermined components, a filter memory or storage 123 for storing therein a kernel of a filter to be used in the image expanding section 122, an expansion result storage section 124 for storing therein the expanded image information, a feature extracting section 125 for extracting, from the information items stored in the expansion result storage section 124, image features including line segments, end points of the line segments, and connective relationships between the line segments, a feature storage section 126 for storing therein the image features obtained by the feature extracting section 125, an image recognizing section 127 for collating the features loaded in the feature storage section 126 with features related to known objects stored in an object feature storage section 128 to recognize an object, a view point controller 124 for controlling the feature extracting section 125 based on a result of the recognition achieved by the image recognizing section 127, and a recognition result display section 130 having a CRT and/or a printer for displaying and/or for printing out a result of the recognition.

Next, a description will be given in detail of the operations of the respective components of the image recognizing apparatus configured as described above.

The image expanding section 122 expands, based on the filter kernel stored in the filter storage section 123, the digital information produced by converting the image information by use of the image input section 121 into a polynomial. In the expansion of the polynomial, for each pixel constituting the image, a product sum is computed with the filter kernel in the neighborhood of the pixel set as the center thereof.

For the expansion of image information into polynomial, the following filter kernels are used.

(i) Filter $W_0(i, j)$ to obtain constant term $$W_0(i,j) = \frac{1}{\sqrt{2\pi} \, \sigma} \cdot \exp\left(-\frac{i^2+j^2}{2\sigma^2}\right) \quad (23)$$

(ii) Filter $W_1(i, j, k)$ to obtain term of 1st degree $$\begin{cases} W_1(i,j,k) = \frac{1}{\sqrt{2\pi} \, \sigma^2} \cdot X(k) \cdot \exp\left(-\frac{i^2+j^2}{2\sigma^2}\right) \\ X(k) = i \cdot \cos(k\theta) - j \cdot \sin(k\theta) \end{cases} \quad (24)$$

(iii) Filter $W_2(i, j, k)$ to obtaion term of 2nd degree $$\begin{cases} W_2(i,j,k) = \frac{1}{2\sqrt{\pi} \, \sigma^3} \{X(k)^2 - \sigma^2\} \\ \qquad \qquad \exp\left(-\frac{i^2+j^2}{2\sigma^2}\right) \\ X(k) = i \cdot \cos(k\theta) - j \cdot \sin(k\theta) \end{cases} \quad (25)$$

Figure 13A:
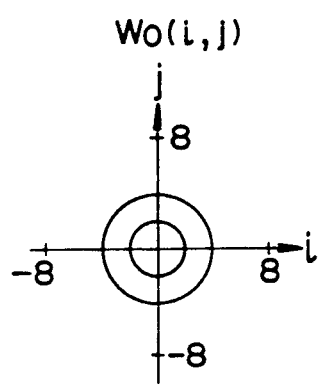
FIGS. 13A to 13C are schematic diagram showing example of a filter kernels to develop an image.
Figure 13B:
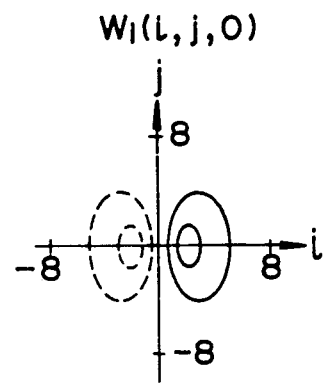
Figure 13C:
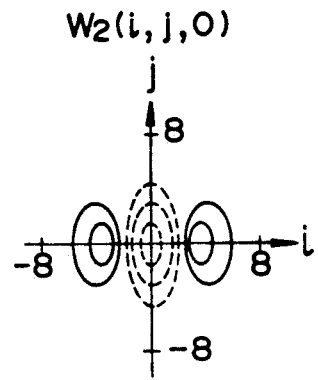

Where, $\sigma$ is an appropriate constant and $\theta$ of a filter to atain the 1st-degree and 2nd-degree terms represents an angle of a directional interval of the filter. For example, in a case of $\theta = 15°$, filters associated with 12 directions of $k = 0, 1, \ldots, 11$ are employed. The kernels of the filters represented by expressions (23) to (25) are computed in ranges $-l \leq i \leq l$ and $-l \leq j \leq l$ (l is an appropriate positive integer) so as to be stored in the filter storage section 123 in advance. FIGS. 13A to 13C illustratively show filters for $\sigma = 2$ in contour lines, where the diagrams of $W_1(i, j, k)$ and $W_2(i, j, k)$ are only associated with a case of $k = 0$. Solid and dotted contour lines indicate positive-value and negative-value portions, respectively.

In the image expanding section 122, the operation of product sum is conducted with the filters $W_0(i, j)$, $W_1(i, j, k)$ and $W_2(i, j, k)$ centered on each pixel of the image. For example, a result of the product sum centered on a pixel at a position (x, y) can be computed by use of the expressions (26) to (28) as follows.

$$S_0(x,y) = \sum_{i=-k}^{k} \sum_{j=-k}^{k} I(x+i, y+j) W_0(i,j) \quad (26)$$

$$S_0(x,y,k) = \sum_{i=-k}^{k} \sum_{j=-k}^{k} I(x+i, y+j) W_1(i,j,k) \quad (27)$$

$$S_0(x,y,k) = \sum_{i=-k}^{k} \sum_{j=-k}^{k} I(x+i, y+j) W_2(i,j,k) \quad (28)$$

Where, I(x, y) represents a brightness of a pixel at the postion (x, y).

Figure 14:
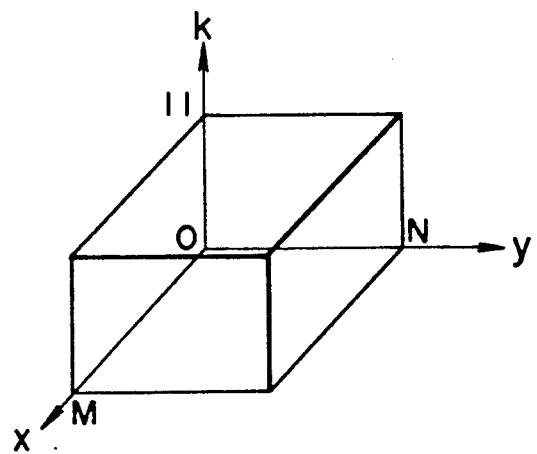
FIG. 14 is a diagram showing a configuration of 7 a result of a product sum operation of an image filter.
Figure 15:
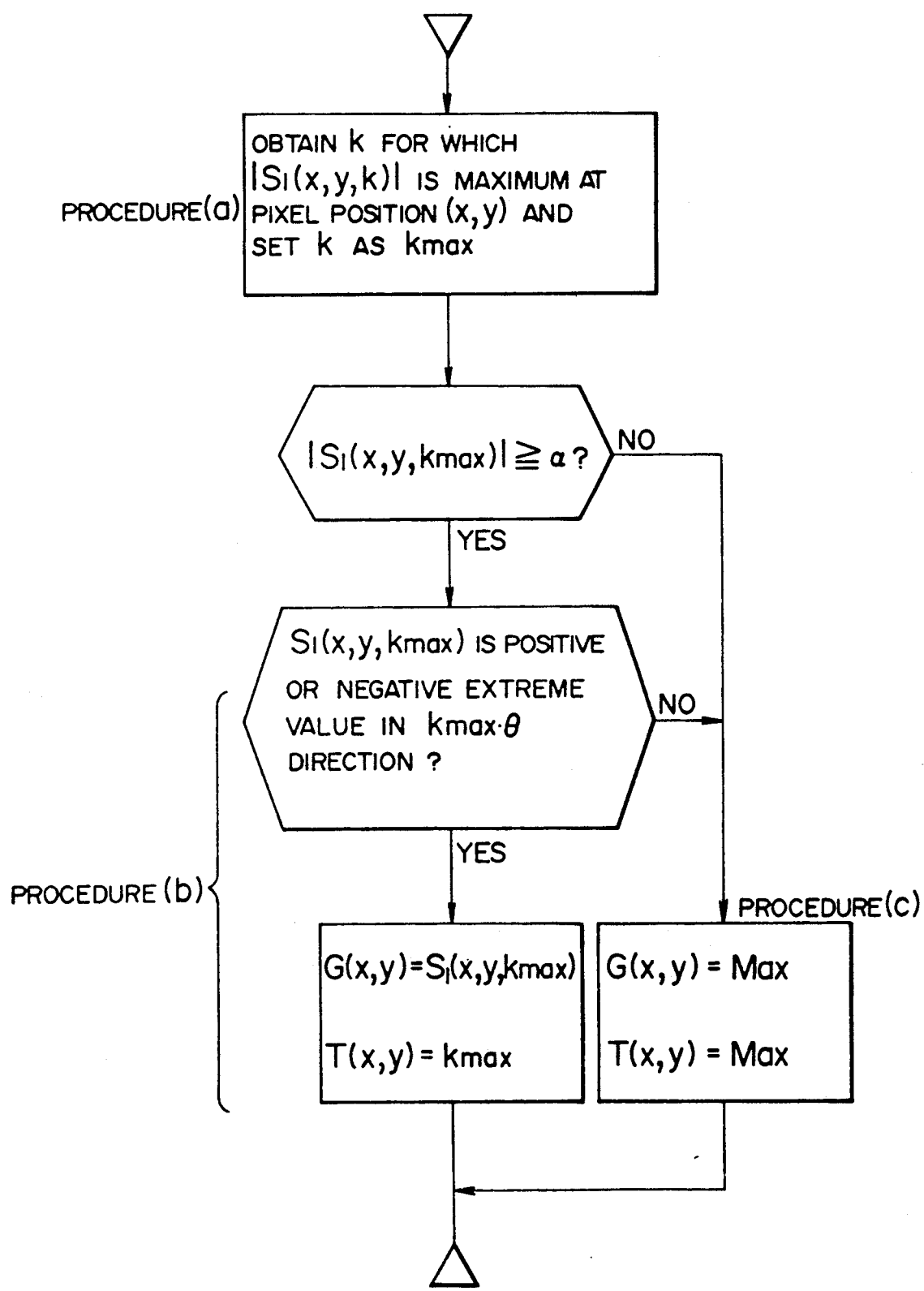
FIG. 15 is a flowchart showing a processing procedure associated with the result of the product sum operation.

Each of the computations of the expressions (27) and (28) results in a three-dimensional array as shown in FIG. 14. In this case, however, it is assumed that the image size is defined as $0 \leq x \leq M$ and $0 \leq y \leq M$, $\theta = 15°$, and $k = 0, 1, \ldots, 11$. By use of these arrays, through a procedure shown in FIG. 15, characteristic pixels are extracted for the 1st-degree and 2nd-degree terms. Although the procedure of FIG. 15 is associated with a result $S_1(x, y, k)$ of the 1st-degree product sum, the processing of a result $S_2(x, y, k)$ of the 2nd-degree product sum can also be executed in the completely same manner. Next, a description will be given in detail of the procedure of FIG. 15.

(a) At each pixel position (x, y), the system obtains k for which the absolute value of the result $S_1(x, y, k)$ of the product sum develops the maximum value, which is set as $k_{max}$.

(b) When $|S_1(x, y, k_{max})|$ is at most equal to an arbitrary threshold value $a$, a procedure (c) is conducted.

When $|S_1(x, y, k_{max})|$ exceeds the arbitrary threshold value $a$, the system checks to determine whether or not $S_1(x, y, k_{max})$ satisfies the subsequent conditional expressions in the cases below.

(i) $S_1(x,y,k_{max}) \geq a$ $$\begin{cases} S_1(x,y,k_{max}) \geq S_1(x-u, y-v, k_{max}) \\ S_1(x,y,k_{max}) \geq S_1(x+u, y+v, k_{max}) \end{cases} \quad (29)$$

(ii) $S_1(x,y,k_{max}) \leq a$ $$\begin{cases} S_1(x,y,k_{max}) \leq S_1(x-u, y-v, k_{max}) \\ S_1(x,y,k_{max}) \leq S_1(x+u, y+v, k_{max}) \end{cases} \quad (30)$$

Where, (u, v) is defined depending on the value of $k_{max}$ as follows (for $\theta = 1520$).

(i) $k_{max} \cdot \theta = 165°, 0°, 15°$ $$(u, v) = (1, 0) \quad (31)$$

(ii) $k_{max} \cdot \theta = 30°, 45°, 60°$ $$(u, v) = (1, -1) \quad (32)$$

(iii) $k_{max} \cdot \theta = 75°, 90°, 105°$ $$(u, v) = (0, 1) \quad (33)$$

(iv) $k_{max} \cdot \theta = 120°, 135°, 150°$ $$(u, v) = (-1, 1) \quad (34)$$

When $S_1(x,y,k_{max})$ does not satisfy the expressions (29) or (30), the processing of the expression (35) is conducted, and then control returns to the procedure (a) to execute processing for other pixels.

$$\begin{cases} G_1(x,y) = S_1(x,y,k_{max}) \\ T_1(x,y) = k_{max} \end{cases} \quad (35)$$

When $S_1(x,y,k_{max})$ does not satisfy the expressions (29) and (30), the processing of the procedure (c) is carried out.

(c) G(x,y) and T(x,y) are respectively replaced with the values of an expression (36).

$$\begin{cases} G_1(x,y) = \text{Max} \\ T_1(x,y) = \text{Max} \end{cases} \quad (36)$$

Where Max indicates an appropriately large value. For example, this value need only be the maximum value which can be stored in the expansion result storage section 124.

The processing of the image expanding section 122 has been described. Also for the result $S_2(x,y,k)$ of product sum of the 2nd-degree, the values of $G_2(x,y)$ and $T_2(x,y)$ can be computed in a similar fashion to the procedure of in FIG. 15. $G_1(x,y)$ and $T_1(x,y)$ respectively indicate a local peak value of the 1st-degree term and a direction thereof, that is, a position of a pixel (an edge) at which a large change takes place in the brightness and information of the direction of the maximum gradient at the position. Similarly, $G_2(x,y)$ and $T_2(x,y)$ respectively indicate a position of a pixel at which a large horizontal wave change takes place and information of the magnitude and direction of the change at the position.

Figure 16:
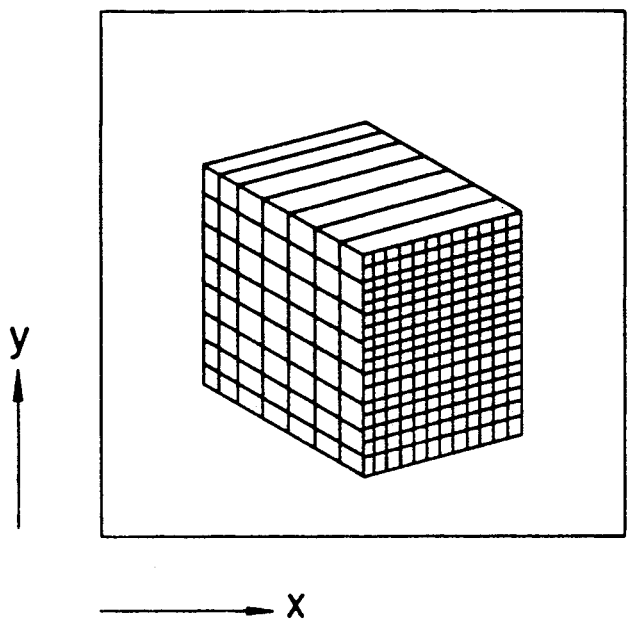
FIG. 16 is a schematic diagram showing an example of an original image.
Figure 17:
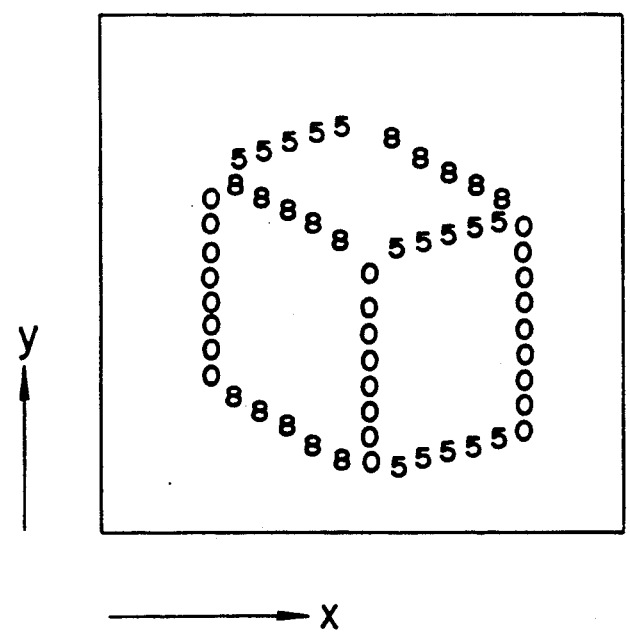
FIG. 17 is a diagram useful to explain positions of local maximum and minimum values of expansion coefficients attained from the original image.

Information produced through the processing of the image expanding section 122, namely, $S_0(x,y)$, $G_1(x,y)$, $T_1(x,y)$, $G_2(x,y)$, and $T_2(x,y)$ are sent to the expansion result storage section 124 so as to be stored therein. For example, in a case where an image similar to the image of FIG. 16 is received from the image input section 121, the result $T_1(x,y)$ obtained through the processing of the image expanding section 122 is as shown in FIG. 17 (a portion associated with $T_1(x,y) = $ Max is omitted.) In FIG. 17, pixels indicated as 0, 5, and 8 are respectively portions of the vertical line, line segments each having an upward direction of 15° toward the right-hand side, and line segments each having a downward direction of 30° toward the right-hand side.

Next, a description will be given in detail of processing achieved in the feature extracting section 125. This section 125 extracts features constituting an image so as to represent the image with a combination of the features. Using the expansion coefficient $T_1(x,y)$ of FIG. 17 as an example, the processing will be described in detail.

Figure 19:
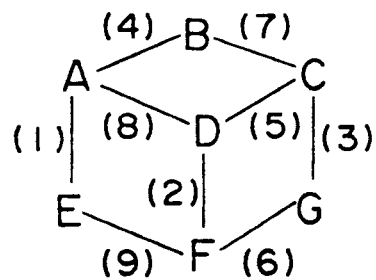
FIG. 19 is a schematic diagram showing a connection graph of line segments representing features of an image and a list of parallel line segments.
Figure 18A:
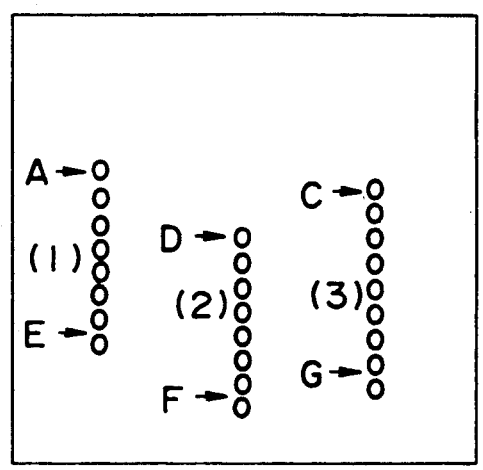
FIGS. 18A to 18C are diagrams showing results of operations to extract parallel line segments and end points thereof.
Figure 18B:
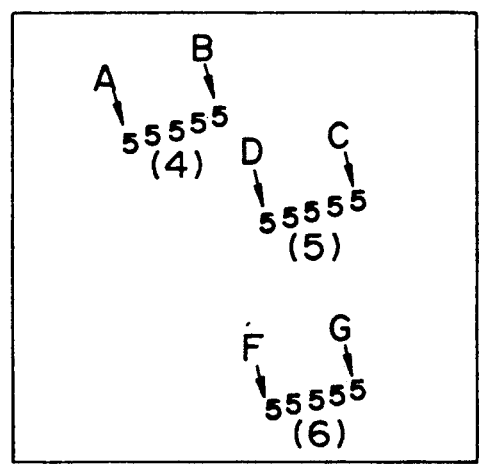
Figure 18C:
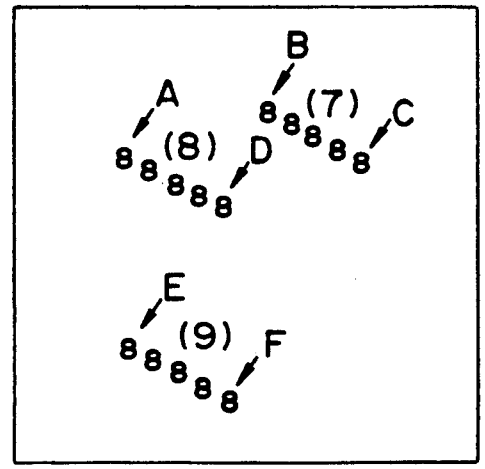

First, line segments of the respective directions are extracted by use of the expansion coefficient $T_1(x,y)$ of FIG. 17 so as to transform the input image of FIG. 16 into sets of parallel lines as shown in FIGS. 18A to 18C obtaining end points of the respective line segments, the pixels marked with arrows in FIGS. 18A to 18C are recognized to constitute the end points. By retrieving end points in the neighborhood centered on each end point, it is possible to extract a set of line segments crossing each other at the end point. In the case of FIGS. 18A to 18C, nine line segments (1) to (9) are linked with each other at seven intersections A to G. Consequently, the input image of FIG. 16 can be represented as shown in FIG. 19. In this figure, portions (a) and (b) respectively are a graph representing relationships between seven intersections and the line segments connecting these intersections and a list of sets of parallel line segments. The graph and the list produced in the feature extracting section 125 is fed to the feature storage section 126 so as to be stored therein.

Next, the processing of the image recognizing section 127 will be described in detail. The image recognizing section 127 compares the feature data stored in the feature storage section 126 with the features of known objects beforehand stored in the object feature storage section 128 to determine an object having the highest similarity. The image recognizing section 127 conducts graph and list matching operations, which are generally known in the art, between the graph and the list of FIG. 19 and graphs and lists which represent various objects and which are stored in the object feature storage section 128.

When the features stored in the feature storage section 126 match with a set of the object features stored in the object feature storage section 128, the image recognizing section 127 supplies a recognition result display section 130 with the data of the feature storage section 126 and a name of the pertinent object stored in the object feature storage section 128, thereby displaying the data and the name on the display section 128.

In the image recognizing section 127, as a result of the comparison with the object features stored in the feature storage section 126, if there exists object features for which a correspondence relationship is satified by adding arbitrary line segments and/or intersections to the features stored in the feature storage section 126, positions and connective relationships of such line segments and/or intersections are transmitted via a view point control section 129 to the feature extracting section 125. In the neighborhood of each line segment or intersection to be added, the feature extracting section 125 sets a smaller value to the threshold value $\alpha$ for the feature extraction so as to execute again the procedure of FIG. 15. New features thus extracted are stored in the feature storage section 126, so that after the processing of the image recognizing section 127 is re-executed, the new features are displayed on the recognition result display section 130. In a case where such new features are not obtained, the result of the previous processing of the image recognizing section 127 is directly displayed on the recognition result display section 130.

In accordance with the present invention, consecutive line segments, directions thereof, and intersections therebetween can be correctly extracted from an image. Consequently, the present invention is applicable to various kinds of apparatuses in which features are extracted from an image to recognize the image.

In a case where information supplied from the image input section 121 includes characters; directions, lengths, and connective relationships of line segments constituting each character can be easily detected from the image. In consequence, with a provision of the object feature storage section 128 beforehand loaded with features of objective characters, a character recognition apparatus having a reduced wrong recognition ratio can be provided.

In a case where information supplied from the image input section 121 is an image read from various kinds of drawings; directions, lengths, and connective relationships of line segments constituting the drawings or graphics can be easily detected from the image. In consequence, by beforehand storing features of the segments, symbols, and characters constituting the drawings in the object feature storage section 128, it is possible to provide a graphic or drawing recognition apparatus having an improved graphic recognition ratio.

The information supplied from the image input section 121 is not limited to an image, namely, and numeric data arranged in a two-dimensional array can be processed. For example, geographic information representing geographical features of altitude of a land may also be acceptable. Such information items can be easily produced from a map represented with contour lines. In a case where information supplied from the image input section 121 is geographic information, by beforehand storing features of constituent elements of the geographic information such as ridgelines, lines indicating valleys, and lines associated with basins in the object feature storage section 128, it is possible to provide a graphic recognition apparatus which processes the geographic or topological information to interpret the topological features.

FIG. 20 shows an example in which the image processor according to the present invention is embodied in a distance measuring apparatus or a telemeter to obtain a distance to an object by viewing the object in a three-dimensional or stereoscopic fashion with two eyes. The configuration includes identical image preprocessing sections 91 and 92 each constituted, in the same fashion as the system of FIG. 12, with the image input section 121, the image expanding section 122, the filter storage section 123, the expansion result storage section 124, the feature extracting section 125, and the feature storage section 126. The image input sections 121 of the image preprocessing sections 91 and 92 include a pair of TV cameras apart from each other by a fixed distance so as to simultaneously shoot an object to obtain a pair of images. These images are respectively processed in the preprocessing sections 91 and 92. The paired features from the image reprocessing sections 91 and 92 are processed by a corresponding point decision section 93 to establish correspondence between features respectively thereof having the highest similarity therebetween. The resultant data is received by a distance computing section 94 to compute, based on an amount of positional discrepancy between the corresponding features, a distance to the object according to the principle of trigonometry. The computation result is displayed on a distance display section 95.

According to the present invention, features including successive line segments, directions thereof, and intersections therebetween can be exactly obtained from an image. In consequence, a corresponding relationship between a pair of images can be easily determined, thereby providing a distance measuring apparatus to measure a distance with a high precision by viewing an object in a three-dimensional or stereoscopic fashion with two eyes.

Figure 21:
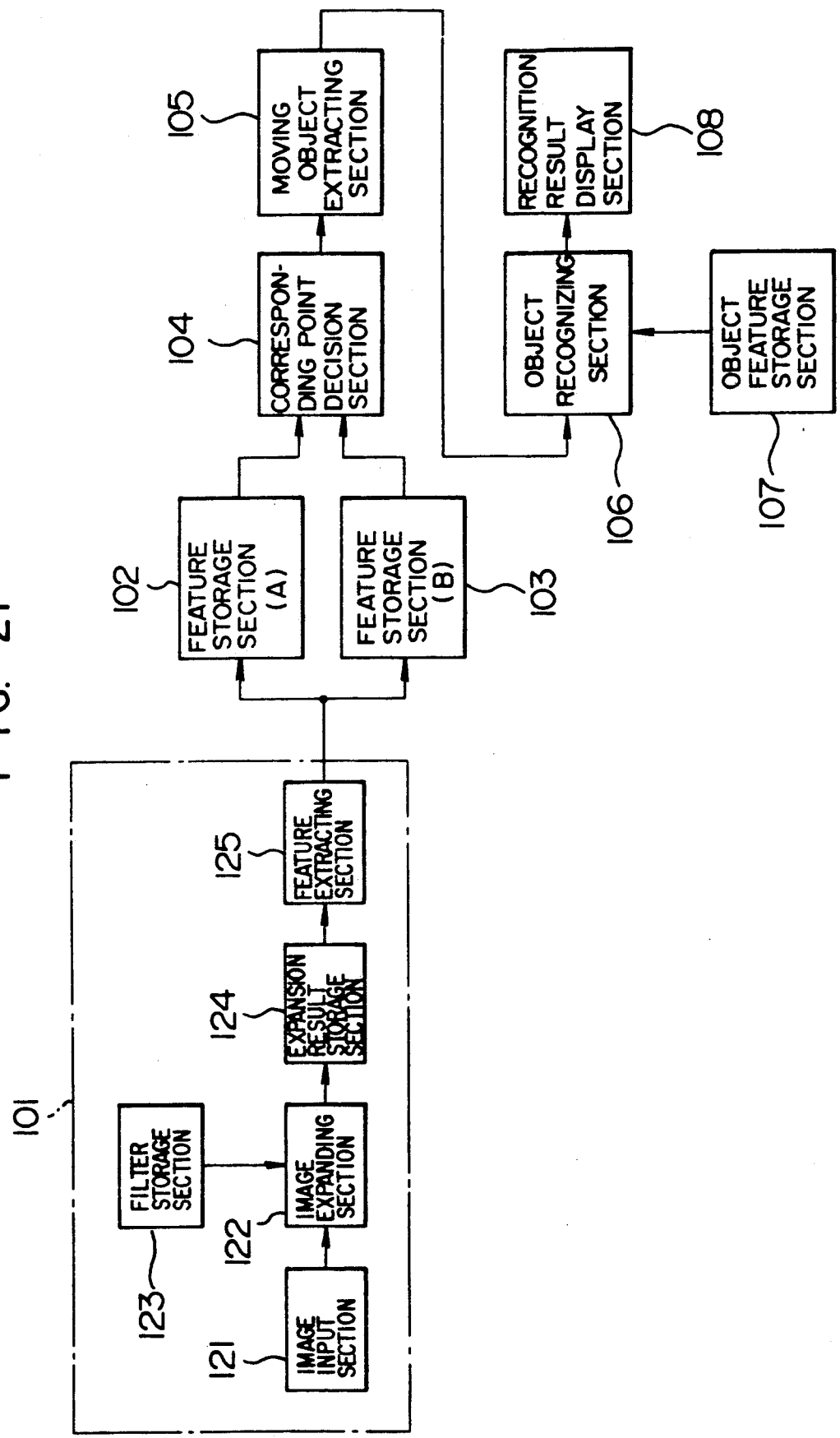
FIG. 21 is a block diagram showing an example of the constitution of a moving-object recognizing device according to the present invention.

FIG. 21 shows an example of the constitution in which the image processor according to the present invention is embodied as a moving object recognition apparatus. This system includes an image preprocessing section 101, which is constituted, in the same fashion as the system of FIG. 12, with the image input section 121, the image expanding section 122, the filter storage section 123, the expansion result storage section 124, and the feature extracting section 125. The configuration further includes a feature storage section (A) 102 and a feature storage section (B) 103 in which features of an image shot by the image input section 121 at a fixed interval time are stored. The features of the image stored in these storage sections (A) and (B) are processed by a corresponding point decision section 104 to establish a correspondence between features having the highest similarity therebetween. Based on the amount of movement of each features from the corresponding point decision section 104, only the features related to the moving object are extracted in a moving object extracting section 105. The features attained from the moving object extracting section 105 and features of objects beforehand stored in an object feature storage section 107 are compared with each other in an object recognizing section 106 so as to recognize the moving object. The result of recognition is displayed on a recognition result display section 108.

According to this embodiment, there can be provided a moving object recognizing apparatus in which a moving object can be extracted by use of features including directions and intersections of line segments constituting an image and in which based on the features thus obtained, the moving object is recognized.

FIG. 22 shows an example of an image compression and transmission apparatus to which the image processor according to the present invention is applied. The system of FIG. 22 includes an image transmitting section 111 comprising an image input section 121, an image expanding section 122, a filter storage section 123, an expansion result storage section 124, a feature extracting section 112, a feature storage section 113, and an image compressing section 114. The feature extracting section 112 extracts features necessary for an image compression from data obtained by expanding an image in the image expanding section 124. For example, $I(x,y)$ and $G_2(x,y)$ may be employed as features necessary for the image compression. The features are stored in the feature storage section 113. From the data stored in the feature storage section 113, the image compressing section 114 extracts a pixel position where the value of $G_2(x,y)$ is not Max and a brightness $I(x,y)$ at the pixel position. That is, this section 114 extracts, for the image compression, all sets each including three data items satisfying the following expression.

$$\{x,y,I(x,y)\}(0 \leq x \leq M, 0 \leq y \leq N)$$

where, $G_2(x,y) \neq$ Max.

The result of the image compression attained from the image compressing section 114 is fed to an image transmitter 115, which transmits the results to an image receiving section 116 by use of transmit means such as a radio wave or an optical fiber cable.

In the image receiving section 116, the brightness at each characteristic point is restored by a characteristic point restoring section 117. Namely, in an image memory area having the same size as the original image not undergone the compression, the brightness or luminance data $I(x,y)$ is written at a pixel position corresponding to a position (x,y) of the data thus received. The image thus attained in the characteristic point restore section 117 is processed by an image restoring section 118 to conduct a two-dimensional interpolation of a portion in which luminance data is originally missing, thereby interpolating the pertinent portion. The resultant data is displayed as a restored image on an image display section 119.

In the description of this embodiment, the image is compressed under the condition of $G_2(x,y) \neq$ Max, namely, by use of the brightness $I(x,y)$ at the pixel position where the gradient of brightness abruptly changes. In an ordinary image, the number of such pixels is quite small as compared with the total number of all pixels of the image and hence a considerably large compression ratio can be developed. With this compression, the transmission path to send an image can be efficiently utilized and the transmission cost is sufficiently lowered.

By use of the apparatus in accordance with the present invention, a complicated process control can be remarkably improved as follows.

(1) A pattern of time-series state change in the measured process information which cannot be directly measured in the prior art technology can be employed as significant information to judge the process state change.

(2) A problem associated with the processing of interference between variables which has been a hindrance with respect to information when configuring a process model and a problem related to the limitation of numeric computations in a multi-variable model can be solved by translating states of variables into abstract expressions such as symbols so as to use the states in the control operation.

(3) By translating the process data into abstract expressions to be used in the control operation, the accumulated process data can be easily classified and retrieved; furthermore, control rules necessary for the control of an objective process can be registered and used in a form which retains integrity thereof.

(4) Since the process state is approximated by use of a polynomial or is translated into symbols for the control operation, a high-frequency noise included in the measured value can be removed and hence the process state is correctly determined at a high speed.

(5) Since information related to the process can be presented in an abstract expression (a language, symbols, etc.) to be easily understood by a human, it is possible to construct a man-machine interface having a high visibility to recognize the process state.

(6) An effective analysis can be achieved at a high speed also in systems, for example, in a system to be employed in a department store or a shop for a control of articles or in a security facility to handle several thousand kinds of stock prices, namely, in a system in which more than 104 time-series variables are monitored to decide a management plan or a sales strategy.

Furthermore, the following effects are attained by applying the present invention to the image processing.

(1) Since features constituting an image are extrated depending on classification thereof along a direction of the brightness change, line segments and end points thereof can be easily extracted for respective gradient directions.

(2) Since the image expansion is computed through a product sum operation with a filter, the processing is achieved in a uniform fashion.

(3) Since a list of line segments for the respective gradient directions and a graph indicating connections between the line segments can be easily configured, an object recognition is achieved by establishing correspondences between features of an unknown object and those of known objects.

(4) By re-extracting features based on an unmatching between known object features and the features of an object in an image, there can be provided an object recognizing apparatus having an improved object recognition efficiency.

(5) Since clear image features can be obtained, acquisition of corresponding relationships between images is facilitated, and hence there are provided a distance measuring apparatus and a moving object recognining apparatus each having a high precision.

(6) By using line segments for the respective gradient directions and connective relationships between the line segments, there can be provided a character recognzing apparatus, a graphic or drawing recognizing apparatus, and a topological information processing system each having a high recognition efficiency.

(7) By use of characteristic points constituting an image, the image can be compressed with an increased compression ratio and hence there is provided an image compression and transmission apparatus with a high transmission efficiency.

While particular embodiments of the invention have been shown and described, it will be obvious to those skilled in the art that various changes and modifications may be made without departing from the present invention in its broader aspects.

We claim:

1. A processor for controlling a process by performing processing operations on measured process data obtained from said process, said processor comprising:
   process data collecting means for collecting first and second measured process data from said processor and outputting said first and second measured process data;
   data accumulator means connected to said process data collecting means for storing therein said second measured process data;
   processor means connected to said process data collecting means and said data accumulator means for processing measured process data and outputting a result of said processing; and
   controller means connected to said processor means for providing process control signals to said process based on outputs of said processor means;
   said processor means includes:
   parameter storage means for storing therein a series of values in a form of a predetermined filter kernel,
   feature extracting means for providing a plurality of product sun data between said series of values of said predetermined filter kernel and measured process data including said first measured process data and at least a part of said second measured process data in a sequence,
   translation rule means for storing therein combinations of a data value and an abstract expression, and
   translating means for translating said plurality of product sum data into a sequence of abstract expressions by referring to said translation rule means.

2. A processor according to claim 1 wherein said feature extracting means includes a forecasting section for forecasting a change in the state of said process based on a polynomial having terms including said plurality of product sum data as coefficients thereof.

3. A processor according to claim 1 further comprising:
   symbolized data storage for holding said abstract expressions provided form said processor means;
   rule storage means for holding rules each including a further abstract expression regarding stationary and nonstationary states of said process; and
   a status judging section for judging a state of said process by use of said abstract expressions provided from said signal processor means form said symbolized data storage and said rules.

4. A processor according to claim 1 further comprising:
   symbolized data storage for holding said abstract expressions for indicating changes in said process;
   rule storage means for holding a plurality of rules each including information indicating a change in said process as an object of an abstract expression; and
   an inference section for inferring based on one of said plurality of rules by use of said abstract expressions from said symbolized data storage and information indicating a change in said one rule.

5. A processor according to claim 1 further comprising:

symbolized data storage for holding said abstract expressions indicating changes in said process;

causality storage means for holding a plurality of knowledge rules indicating causalities of changes in said process; and a causality inference section for inferring causalities by use of said knowledge rules.

6. A processor according to claim 3 wherein the first three product sum data of said plurality of product sum data are used in said translating means.

7. A processor according to claim 1 wherein said measured process data including said first measured process data and at least said part of said second measured process data is separated into partitions.

8. A processor according to claim 1 further comprising:

a man/machine interface connected to said processor means;

an editing section for editing said translated sequence of abstract expressions provided by said translating means in response to a request from said man/machine interface and outputting a result of said editing; and a report section for reporting the output of the editing section via said man/machine interface.

9. A processor according to claim 5 wherein a control amount is determined by inferring a causality of changes in said process controlled by use of said process control signals.

10. A processor for controlling a process by performing processing operations on measured process data obtained form said process, said processor comprising:

process data collecting means for collecting first and second measured process data from said process and outputting said first and second measured process data;

data accumulator means connected to said process data collecting means for storing therein said second measured process data;

processor means connected to said process data collecting means and said data accumulator means for processing measured process data and outputting a result of said processing; and controller means connected to said processor means for providing process control signals to said process based on outputs of said processor means;

said processor means includes:

parameter storage means for storing therein a series of values in a form of a predetermined filter kernel, feature extracting means for providing a plurality of product sum data between said series of values of said predetermined filter kernel and measured process data including said first measured process data and at least a part of said measured second process data in a sequence, splitting means for splitting said measured process data including said first measured process data and at least said part of said second measured process data into partitions each having an interval, causality storage means for holding a plurality of knowledge rules indicating causalities of changes in said process, a causality inference section for inferring causalities by use of said knowledge rules, translation rule means for storing therein combinations of a data value and an abstract expression, and translating means for translating said plurality of product sum data into a sequence of abstract expressions by referring to said translation rule means.

11. A processor according to claim 10, further comprising:

a memory for accumulating therein said abstract expressions obtained from said translating means.

12. A processor according to claim 10 wherein said causality inference section includes a pattern matching section for obtaining a correspondence relationship between said abstract expressions and a classification and retrieval section for classifying and retrieving information based on the correspondence relationship.

13. A processor according to claim 10 wherein said causality inference section extracts knowledge rules for control of said process by use of said abstract expressions.

14. A processor for controlling a process by performing processing operations on measured process data obtained from said process, said processor comprising:

process data collecting means for collecting first and second measured process data form said process and outputting said first and second measured process data;

data accumulator means connected to said process data collecting means for storing therein said second measured process data;

processor means connected to said process data collecting means and said data accumulator means for processing measured process data; and controller means connected to said processor means for providing process control signals to said process based on outputs of said processor means;

said processor means includes:

a feature extracting section, operative when a brightness change in the vicinity of each of a plurality of pixels of a two-dimensional image of said process is expanded into a combination of polynomials associated with expansion coefficients, for extracting expansion coefficients as features of said image in the vicinity of each of the pixels; and an abstract expression section for translating the extracted features into abstract expressions.

15. A processor according to claim 14 wherein said feature extracting section comprises:

means for determining a kernel of a filter;

a filter storage section for storing therein the determined kernel; and an arithmetic section for conducting a product sum operation between the filter and the image.

16. A processor according to claim 14 wherein said kernel determining means includes means for computing a first order derivative and a second order derivative of a two-dimensional Gaussian function in a fixed direction to determine the kernel based on function values thus obtained.

17. A processor according to claim 15 wherein said kernel determining means includes means for differentiating a Gaussian function in 12 directions with an interval of 15 degrees therebetween.

18. A processor according to claim 14 wherein said features extracting section comprises:

means for extracting, for each pixel, directions in which an expansion coefficient of a first degree and an expansion coefficient of a second degree are each maximum values and for extracting pixel positions at which the expansion coefficient of the first degree and the expansion coefficient of the second degree are maximum values in said directions.

19. A processor for controlling a process by performing processing operations on measured process data obtained from said process, said processor comprising:
- process data collecting means for collecting time sequential first and second measured process data from said processor and outputting said first and second measured process data;
- data accumulator means connected to said process data collecting means for storing therein said second measured process data;
- processor means connected to said process data collecting means and said data accumulator means for processing measured process data; and
- controller means connected to said processor means for providing process control signals to said process based on outputs of said processor means;

said processor means includes:
- parameter storage means for storing therein a series of values in a form of a predetermined filter kernel,
- feature extracting means for providing a plurality of product sun data between said series of values of said predetermined filter kernel and measured process data including said first measured process data and at least a part of said second measured process data in a sequence,
- translation rule means for storing therein combinations of a data value and an abstract expression, and
- translating means for translating said plurality of product sum data into a sequence of abstract expressions by referring to said translation rule means.

* * * * *